United States Patent [19]
Chatham et al.

[11] Patent Number: 5,531,122
[45] Date of Patent: Jul. 2, 1996

[54] FATIGUE ANALYSIS AND WARNING SYSTEM

[75] Inventors: Michael D. Chatham, Bloomington; Paul D. Fotsch, Dunlap; Doyle G. Heyveld, Peoria; Edward P. Kelley, Chillicothe; Walter E. Lohmann, Jr., Decatur; David R. Roley, Morton; Charles F. Sieck, Dunlap; David G. Young, Peoria, all of Ill.

[73] Assignee: Caterpillar Inc., Peoria, Ill.

[21] Appl. No.: 203,240

[22] Filed: Feb. 28, 1994

[51] Int. Cl.⁶ .................................................. G01B 5/300
[52] U.S. Cl. .............................. 73/760; 73/806; 364/508; 364/424.01; 340/438
[58] Field of Search ...................... 73/760, 806; 364/508; 340/438

[56] References Cited

U.S. PATENT DOCUMENTS

| | | | |
|---|---|---|---|
| 4,630,227 | 12/1986 | Hagenbuch | 364/567 |
| 4,635,739 | 1/1987 | Foley et al. | 177/45 |
| 4,700,971 | 10/1987 | Doi et al. | 280/707 |
| 4,744,239 | 5/1988 | Kyrtsos et al. | 73/11 |
| 4,757,454 | 7/1988 | Hisatake et al. | 340/438 |
| 4,831,539 | 5/1989 | Hagenbuch et al. | 364/449 |
| 4,839,835 | 6/1989 | Hagenbuch | 364/567 |
| 4,866,419 | 9/1989 | Kyrtsos et al. | 340/443 |
| 4,887,454 | 12/1989 | Kyrtsos et al. | 73/11 |
| 5,157,610 | 10/1992 | Asano et al. | 340/438 |
| 5,249,127 | 9/1993 | Komatsu | 340/438 |

OTHER PUBLICATIONS

Paper entitled "Modeling Vehicle Suspension Structural Compliance at Ford Using a Coupling of ADAMS & MSC/Nastran" by McGuan & Pintar.
SAE AE-10 "Fatigue Design Handbook" Second Edition by SAE Fatigue Design and Evaluation Technical Committee.
SAE Paper #710708 The Hydrair II Truck Suspension, J. J. France and R. D. Star, Sep. 13-16, 1971.
SAE Paper No. 921735, A Study of the Steady State Roll-Response on a Large Rear-Dump Mining Truck, Int. Off-Highway & Powerplant Congress.

*Primary Examiner*—Richard E. Chilcot, Jr.
*Assistant Examiner*—Max H. Noori
*Attorney, Agent, or Firm*—Steven R. Janda

[57] ABSTRACT

In the field of large construction and mining equipment, significant frame stresses considerably shorten the expected operating life of a machine. This invention provides indications of significant frame stresses on machines having a ground engaging portion, a frame connected to the ground engaging portion, and a plurality of pressure sensing devices. Each of the pressure sensing devices are adapted to produce pressure signals indicative of loads imparted on the frame. The pressure signals are processed to produce frame stress data.

48 Claims, 18 Drawing Sheets

Fig_1_

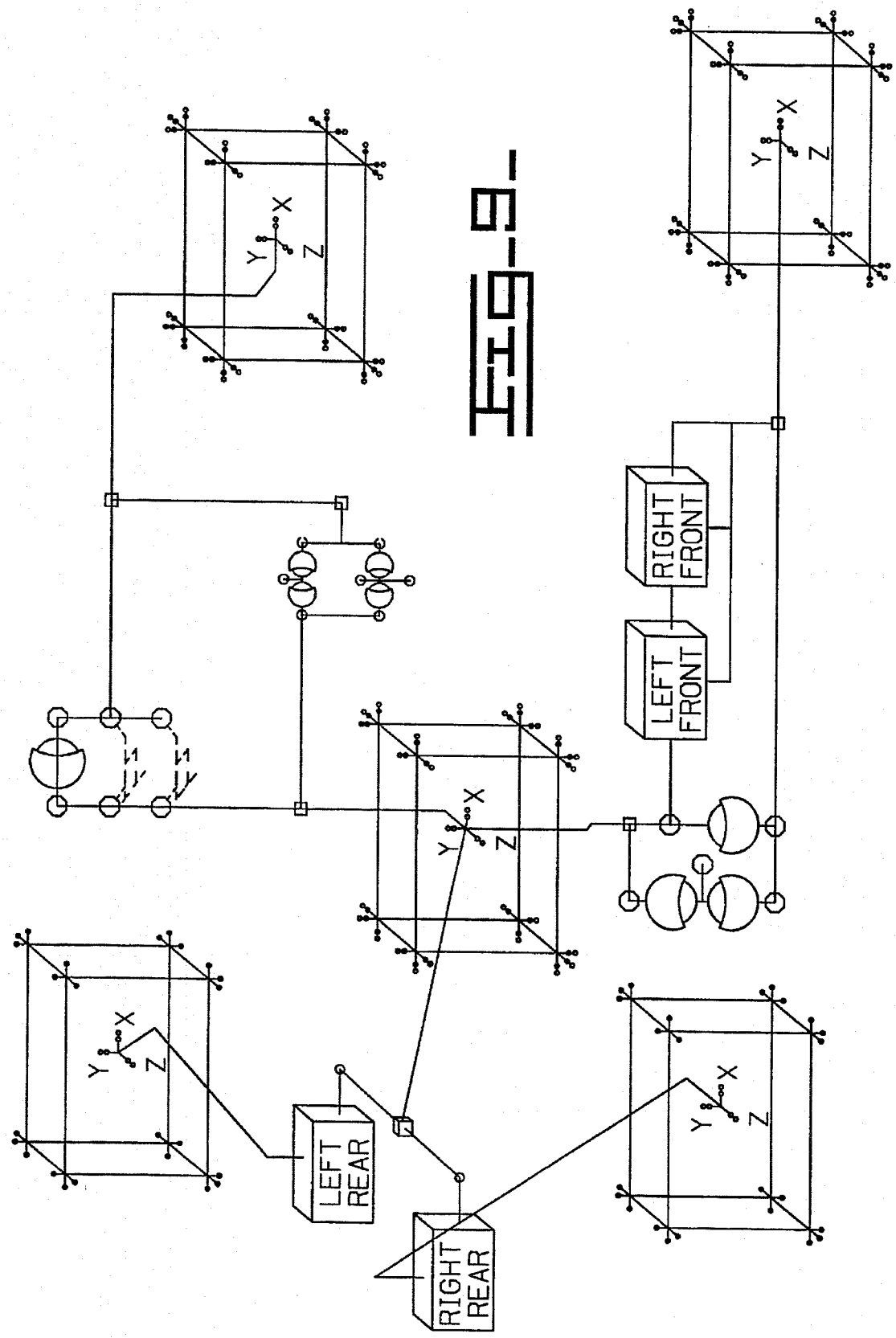

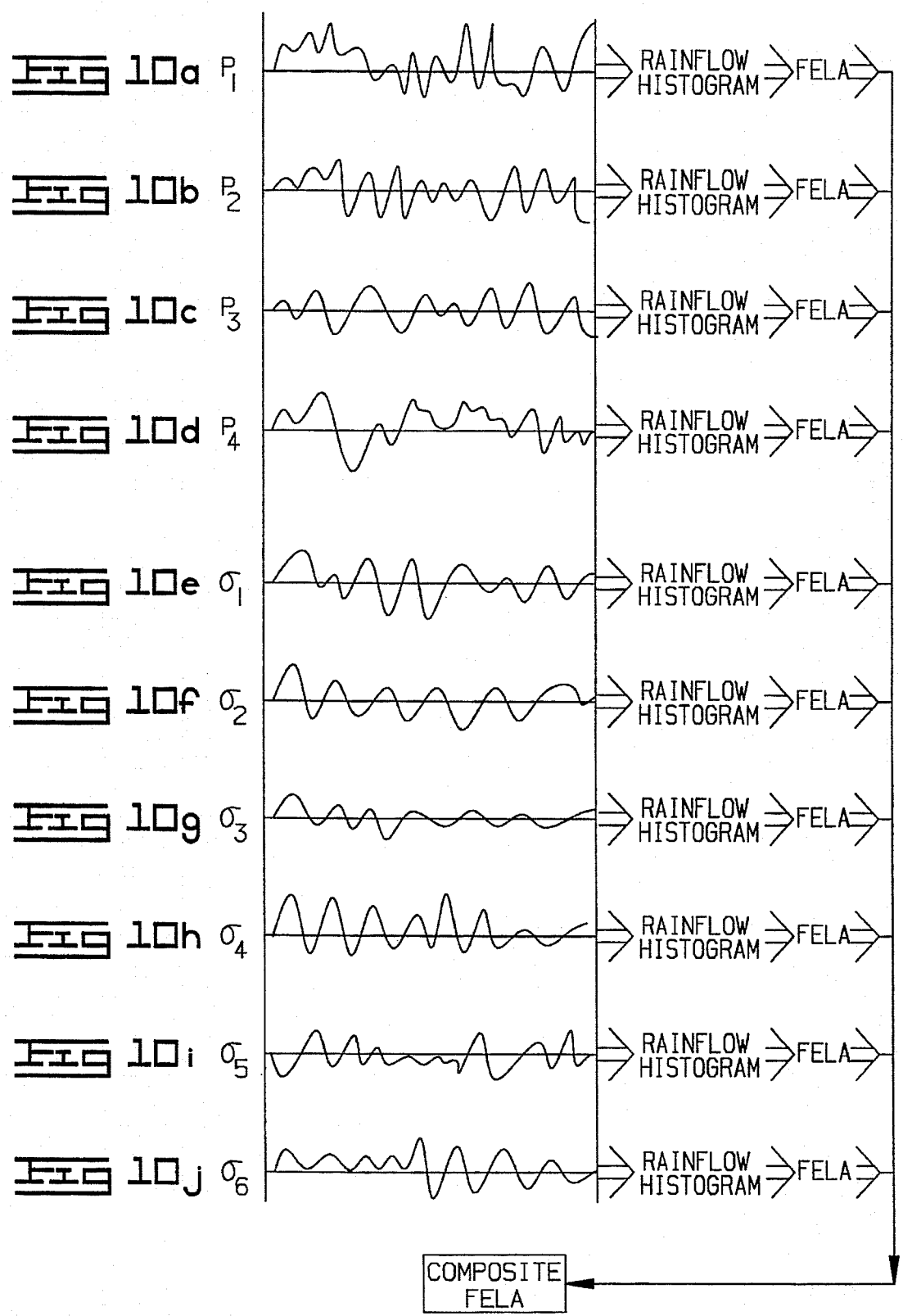

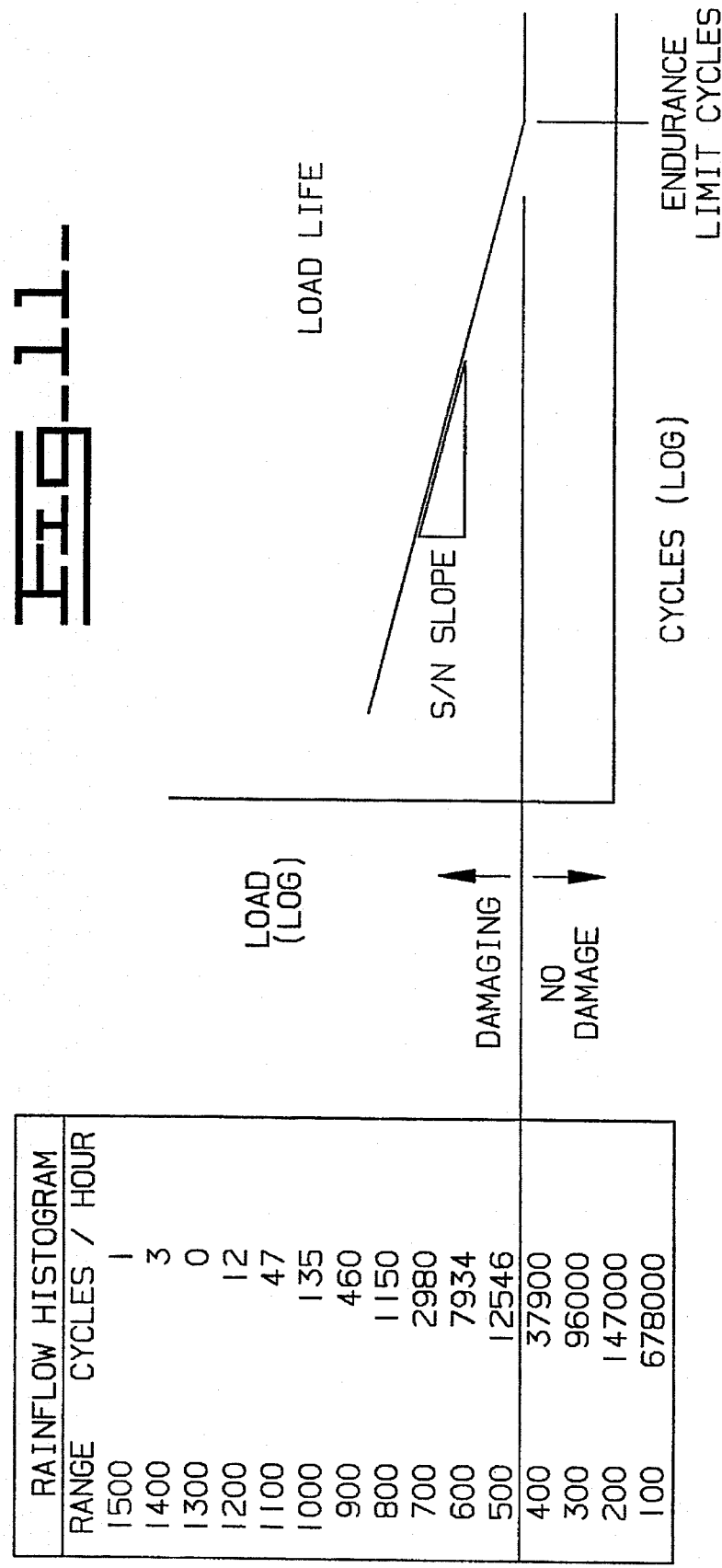
Fig_11

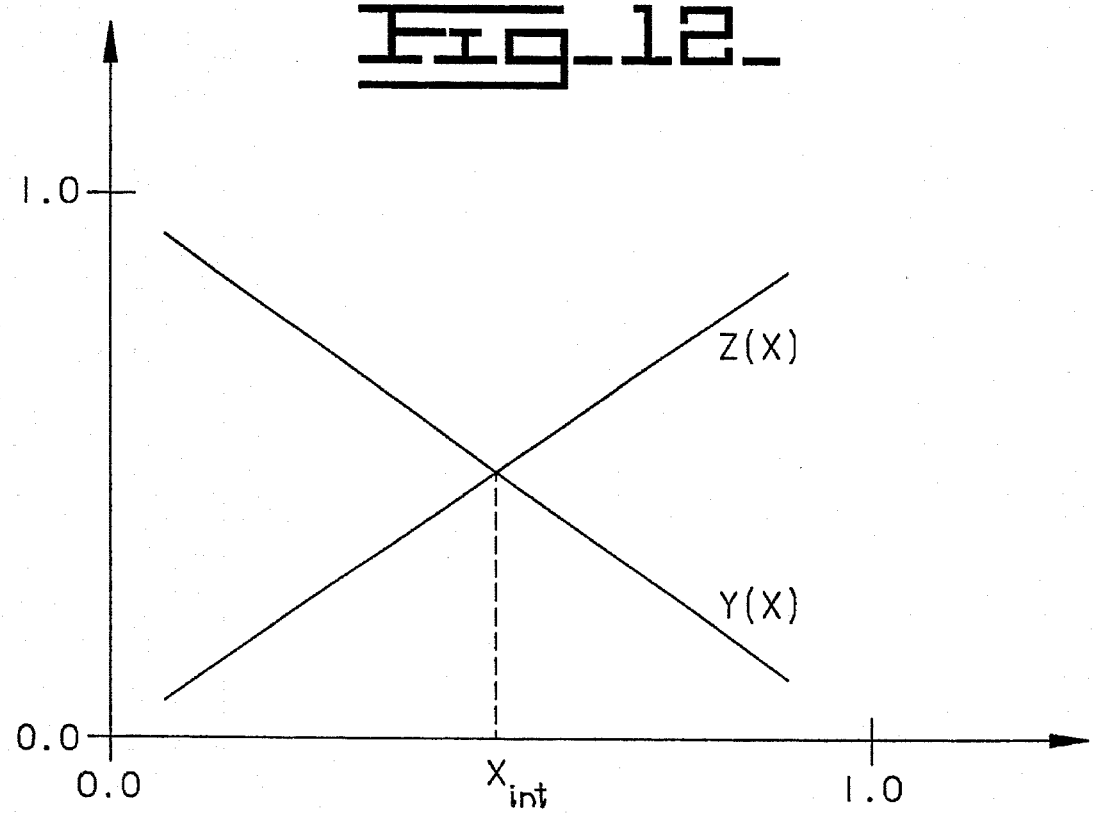

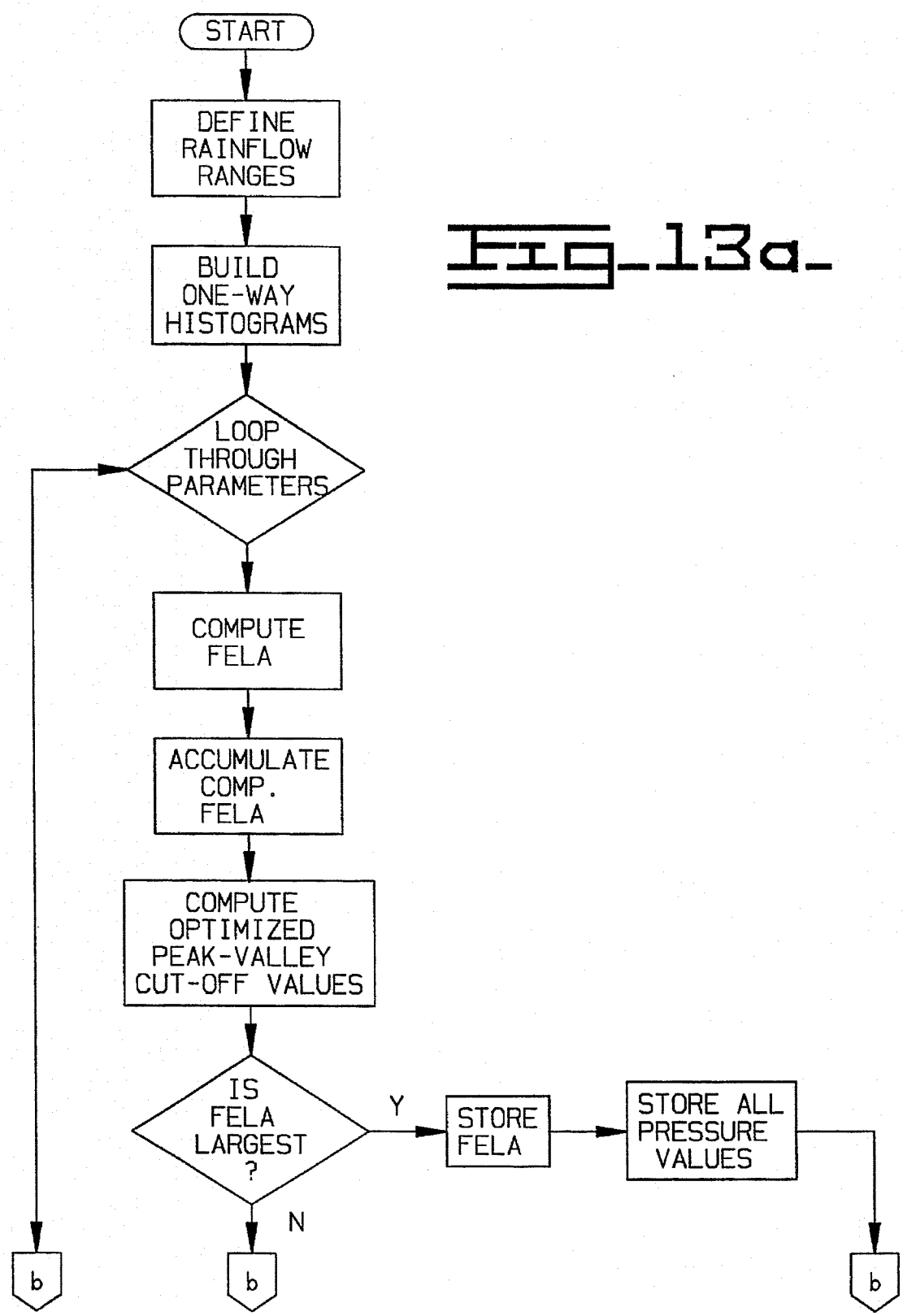
Fig_13a_

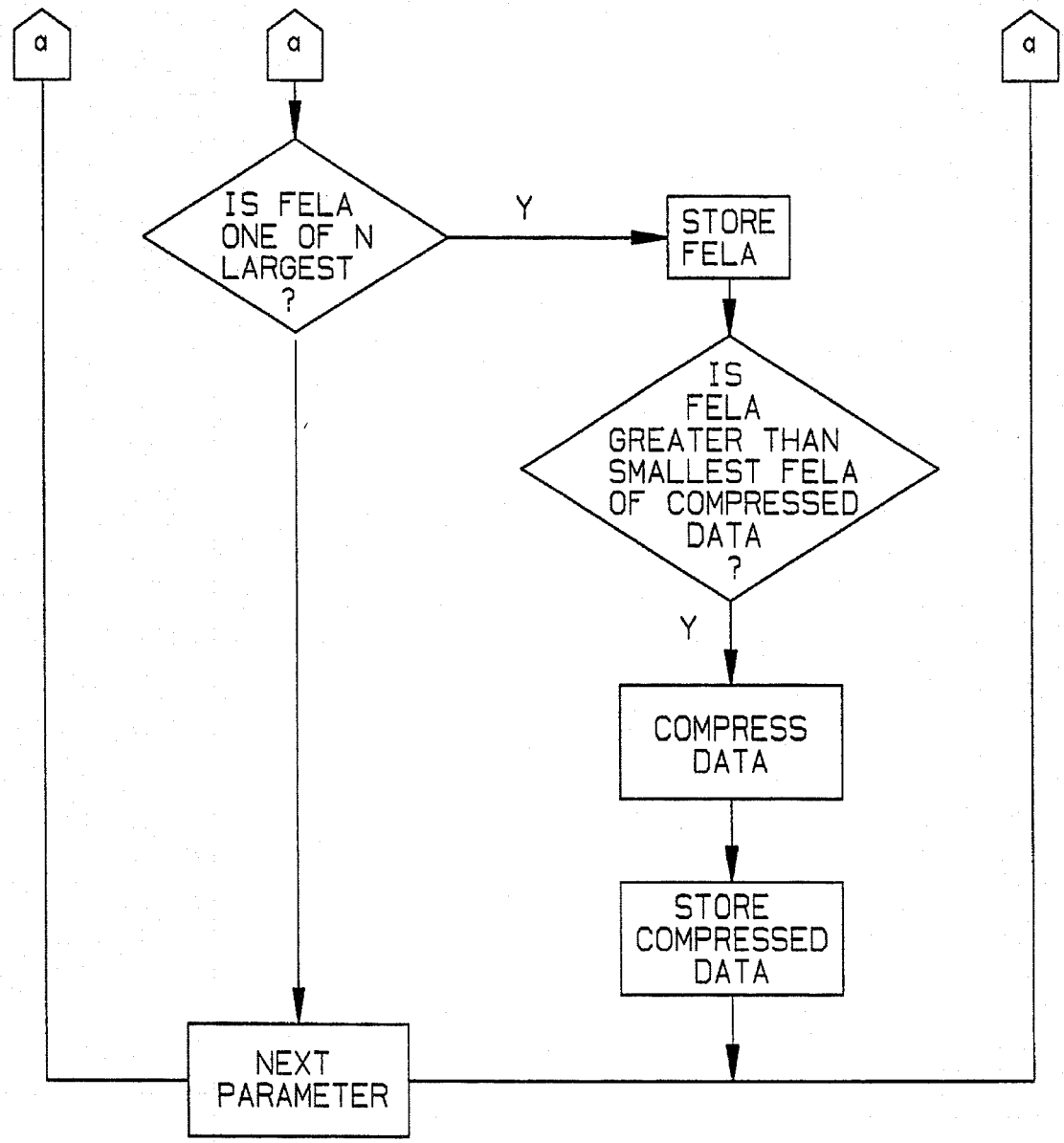
Fig_13b

Fig_16_

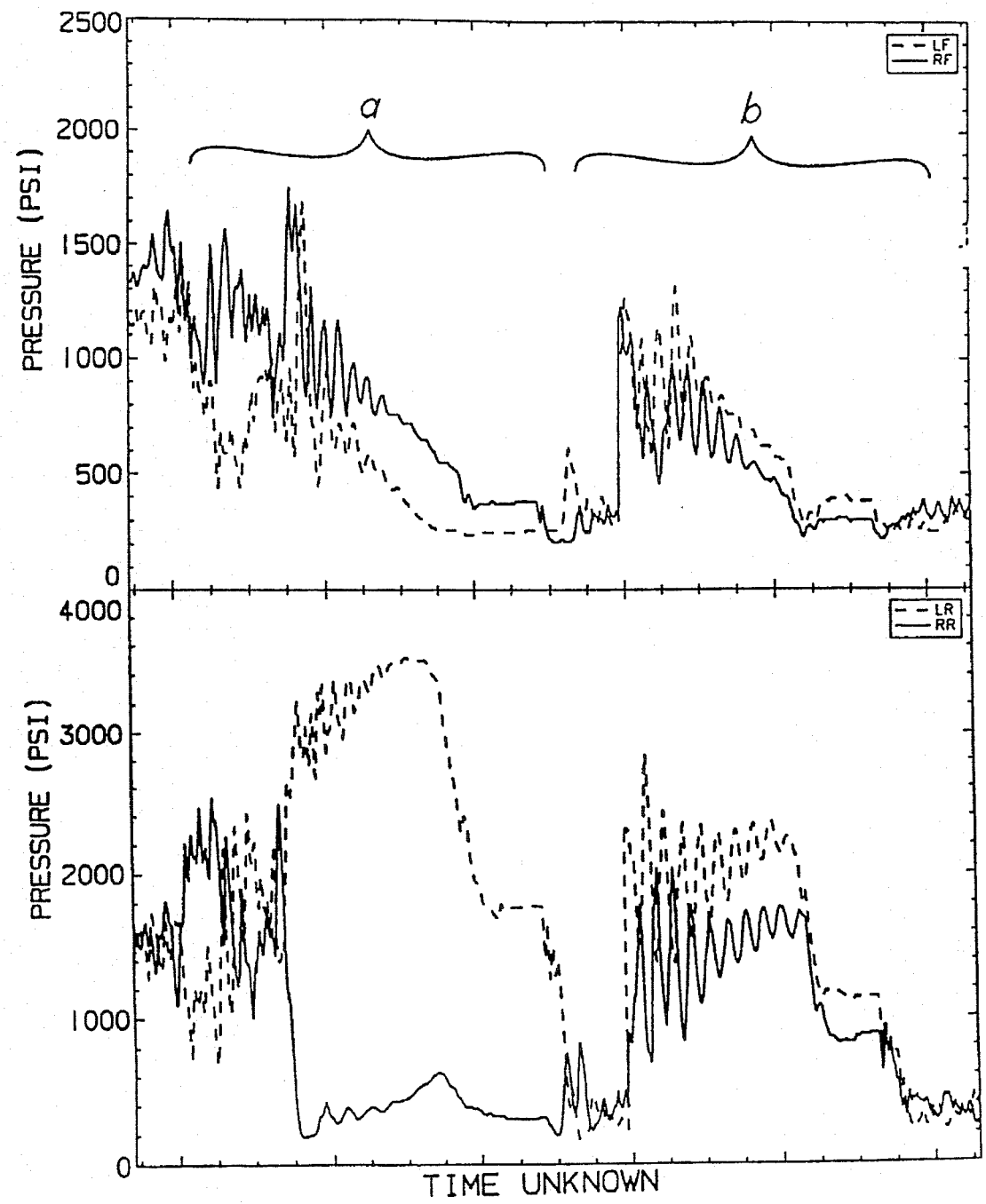
Fig_18_

FATIGUE ANALYSIS AND WARNING SYSTEM

TECHNICAL FIELD

This invention relates generally to evaluating frame and loading characteristics for a large work machine, and more particularly to evaluating frame and loading characteristics in response to pressure signals of sensors located between the load and the ground engaging portion of the machine.

BACKGROUND ART

Large off-highway trucks carry large quantities of ore or overburden over haul roads in open pit mines or in other applications. The conditions in which these trucks are used are typically severe. The haul roads may have ruts, potholes, or large rocks interspersed throughout the work site and must be negotiated by the off-highway trucks. Mine managers attempt to reduce the stresses applied to the trucks by regularly maintaining the haul roads. Many of the obstacles are dependent on the location of the work site or weather conditions and cannot be completely eliminated.

Given the huge weights of materials being hauled, these obstacles can cause the frame of a truck going over the obstacles to twist. These twisting moments cause the truck structural components to fail over time due to metal and weld fatigue. The more severe the work environment, the shorter is the expected fatigue life of the structural components.

Load imbalances may also contribute to fatigue failure by causing similar twisting actions of the truck frame and other structural components. Load imbalances can cause further damage during dumping of the material since the weight is concentrated on the rear of the truck frame when the dump body is raised. The problems associated with truck overloading and load imbalance is therefore exacerbated during dumping.

These trucks represent huge investments and cause great losses of productivity if they require maintenance at unscheduled times. Certainly, one of the most critical aspects in the performance of complex machines such as mining trucks is the structural integrity (e.g., fatigue life) of the major load carrying elements such as the main frame, dump body, and the suspension undercarriage components. It is therefore critical for proper work site management to understand when a truck is being used such that expected life is being reduced. Actions can then be taken to correct whatever is causing the reduction in expected fatigue life of the structural components.

Prior systems have relied upon experience and rough approximations to predict frame life and roading or loading conditions that may cause frame damage. This practice introduces considerable subjectivity into the system and results in the vehicle being operated abusively without knowledge of the extent of potential damage or the causes of damage. It is a somewhat daunting task for a structural design engineer or structural analyst to predict with high confidence the life of such complex structures when they are operated in a wide variety of environments.

Knowledge of potentially damaging events would be useful to not only work site managers, but also the driver of the truck and the operator of the machine loading the truck. For example, the driver could slow the truck down before reaching a particular part of the haul road if during the previous trip he went over a bump and was notified that this caused an event contributing to a shortened frame life. Similarly, if the operator of the machine loading the truck is notified that the load is imbalanced, then he can strive to improve balance by placement of subsequent loads. Furthermore, mine management can use such data to recognize operator abuse of the truck and to improve maintenance of the haul roads. For example, if the mine manager recognizes that the number of potentially frame damaging events is increasing, he can infer that haul road quality is decreasing so that maintenance should be increased.

Other systems, such as the one disclosed in U.S. Pat. No. 4,635,739 issued to D. Foley et al. on Jan. 3, 1987, have shown that strut pressure can be an accurate indicator of payload. The apparatus disclosed therein includes an electronic control that monitors each of the strut pressures, compensates for various inaccuracies introduced by load distribution and vehicle attitude, and correlates this information into actual payload. This payload information allows the truck to be operated efficiently near its maximum capacity without promoting undue vehicle wear. An overloaded vehicle hastens tire and frame damage.

While systems of this type provide accurate indications of payload, they are incapable of identifying events that are sufficiently severe to contribute to frame damage. Payload monitors can provide indications that the load in the truck is above or below its rated capacity; however, frame damage depends upon many other factors and is caused primarily by situations involving uneven stresses rather than simply overloading the truck. Even though a truck is loaded below capacity, it can still undergo events contributing to frame failure. Such damage typically occurs by such events as hitting potholes or ruts or dumping an unbalanced load.

No system available in the prior art correlates suspension and/or load characteristics to the estimated life of the frame. The frame of vehicles of this type are typically complex welded structures and frame damage cannot be correlated directly to payload alone. Due to the complexity of the frame, damage can occur in any of a variety of areas and different types of events can cause damage to different areas. Prior art systems have also not accumulated frame stress data to indicate trends in work severity.

The present invention is directed to overcoming one or more of the problems as set forth above.

DISCLOSURE OF THE INVENTION

The invention avoids the disadvantages of known truck monitoring systems and provides a device capable of providing indications of frame stresses occurring during operation and their expected affect upon expected frame life. The subject invention also provides warnings to the operator and/or to mine management personnel that significant frame stresses have recently occurred or are expected to occur shortly.

In one aspect of the invention, an apparatus is provided including a ground engaging portion, a frame connected to the ground engaging portion, a plurality of pressure sensing devices, and a processor that receives the pressure signals and responsively estimates one or more strains occurring on the frame. Frame stress is quantified in response to the pressure signals and the strain estimates.

In another aspect of the present invention, a method for analyzing frame damage during operation of a machine is provided. The method includes the steps of building a system of equations describing the relationship between strut pressure and frame damage, measuring the amount of pressure in a plurality of sensing devices on the machine, and estimating frame damage in response to the measured pressures.

The invention also includes other features and advantages which will become apparent from a more detailed study of the drawings and specification.

BRIEF DESCRIPTION OF THE DRAWINGS

For a better understanding of the present invention, reference may be made to the accompanying drawings, in which:

FIG. 9 is a model schematic for use in connection with one embodiment of the present invention;

FIG. 10 is a series of strain and pressure values graphed as a function of time;

FIG. 11 illustrates relationships between a rainflow histogram and a load life graph;

FIG. 12 illustrates a method of obtaining a Fatigue Equivalent Load Analysis (FELA) value;

FIGS. 13a and 13b illustrates a flow chart for an algorithm used in connection with an embodiment of the present invention;

FIG. 18 is a graph of strut pressures during dumping portions of an off-highway truck hauling cycle.

BEST MODE FOR CARRYING OUT THE INVENTION

Figure 1:
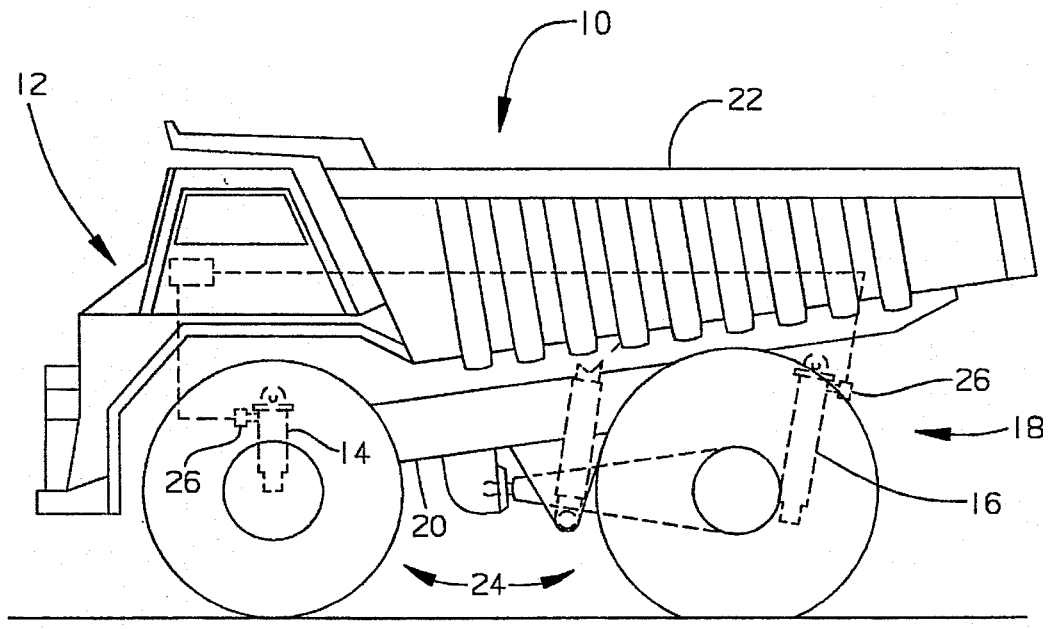
FIG. 1 is a diagrammatic view of an off-highway truck and shows the location of critical suspension components.

The drawings show a preferred embodiment of the present invention. FIG. 1 shows the apparatus 10 as applied on an off-highway mining truck 12. It should be appreciated, however, that the present invention is equally applicable to many types of work machines, such as track-type tractors, wheel-type loaders, motor graders, etc. The truck used in the preferred embodiment has two front and two rear struts 14,16 which are the independent, self-contained, oil-nitrogen type commonly known in the industry. It is sufficient in the understanding of the instant apparatus to recognize that the pressure of the fluid is indicative of the magnitude of load applied to the strut and that wide swings in strut pressures are normal and even expected during certain portions of a haul cycle. The haul cycle known in the art typically includes a loading portion, a roading loaded portion, a dumping portion, and a roading empty portion.

The load carrying portion 18 of the truck includes a main frame 20 and dump body 22. The dump body 22 is connected to the main frame 20 by a pivot pin and a hydraulic cylinder. The contents of the dump body 22 are removed by controllably pressurizing the hydraulic cylinder to effect pivotal movement of the dump body 22 about the pivot pin. In the transport mode, the cylinder is not pressurized and the weight of the dump body is transferred to the frame through the pivot pin and a support pad fixed to the frame 20.

The off-highway truck 12 further includes a ground engaging portion 24, such as a tire, and has two axles with one of the independent, self-contained, oil-nitrogen suspension struts 14,16 connected to each wheel. The rear axle consists of an A-frame which connects to the axle/differential housing known as the banjo housing (shown more clearly in FIG. 4). This assembly is connected to the main frame with a spherical joint, a sway bar, and the two rear struts at the trailing end of the banjo housing.

During loading of the truck, as the payload increases, the load carrying portion 18 is displaced in a direction toward the ground engaging portion 24 Each rear strut 16 begins to compress while the A-frame moment arm pivots about the spherical joint. The rear strut pressure is related to the reaction force between a work surface and the ground engaging portion 24.

The front and rear independent, self-contained, nitrogen-over-oil suspension struts 14,16 provide shock isolation and damping between the unsprung masses and the main frame 20. This type of suspension arrangement is widely used on mining trucks.

Figure 8:
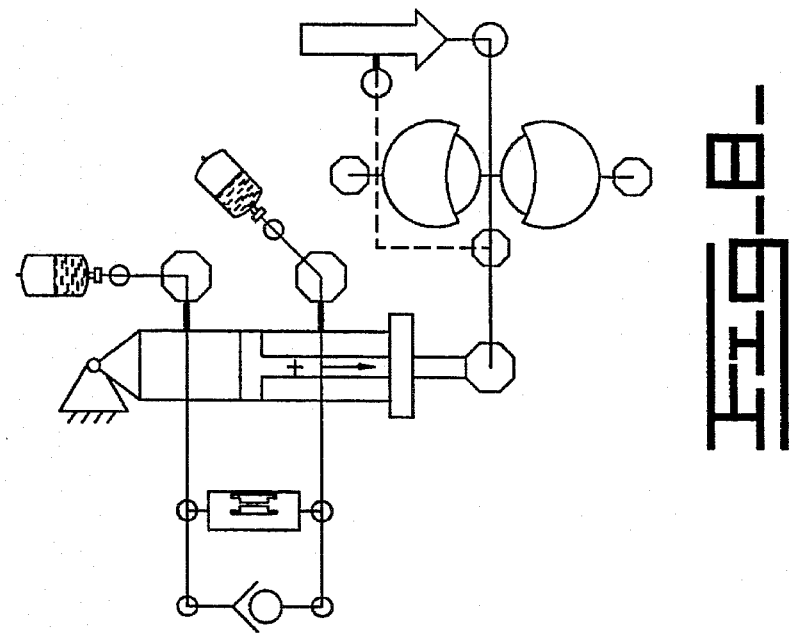
FIG. 8 is a schematic illustration of a rear strut for an off-highway truck.
Figure 7:
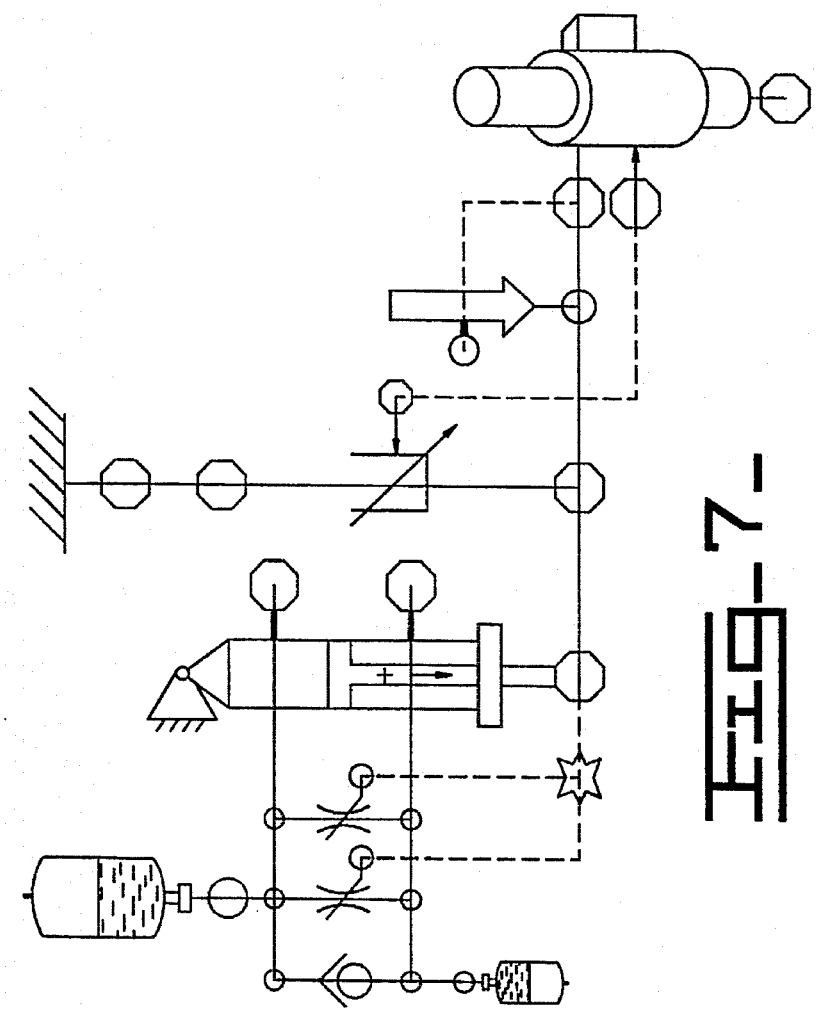
FIG. 7 is a schematic illustration of a front strut for an off-highway truck.

The front strut 14 transmits spring and damping forces into the main frame 20 from the front tire. The body of each front strut 14 is bolted to the truck main frame 20 so that translational motion occurs along the fixed axis of the cylinder. This arrangement is commonly referred to as a sliding pillar. Due to this mounting arrangement and the line of action of the ground input forces, the front strut carries a moment which in turn leads to intermittent stick-slip behavior. The front strut is depicted schematically in FIG. 7. The rear strut component model, which is shown schematically in FIG. 8, includes all of the same effects with one notable exception—the rear strut carries no moment since it is mounted with spherical bearings at both ends of the cylinder. Hence, there is no stick-slip effect on the rear strut.

Of course, the above conditions apply to a particular truck design. It is understood that other chassis configurations may be used. Furthermore, the present invention is not to be limited to off-highway trucks. As described above, the invention is equally applicable to any machine for which it is desirable to understand frame stresses.

Figure 2:
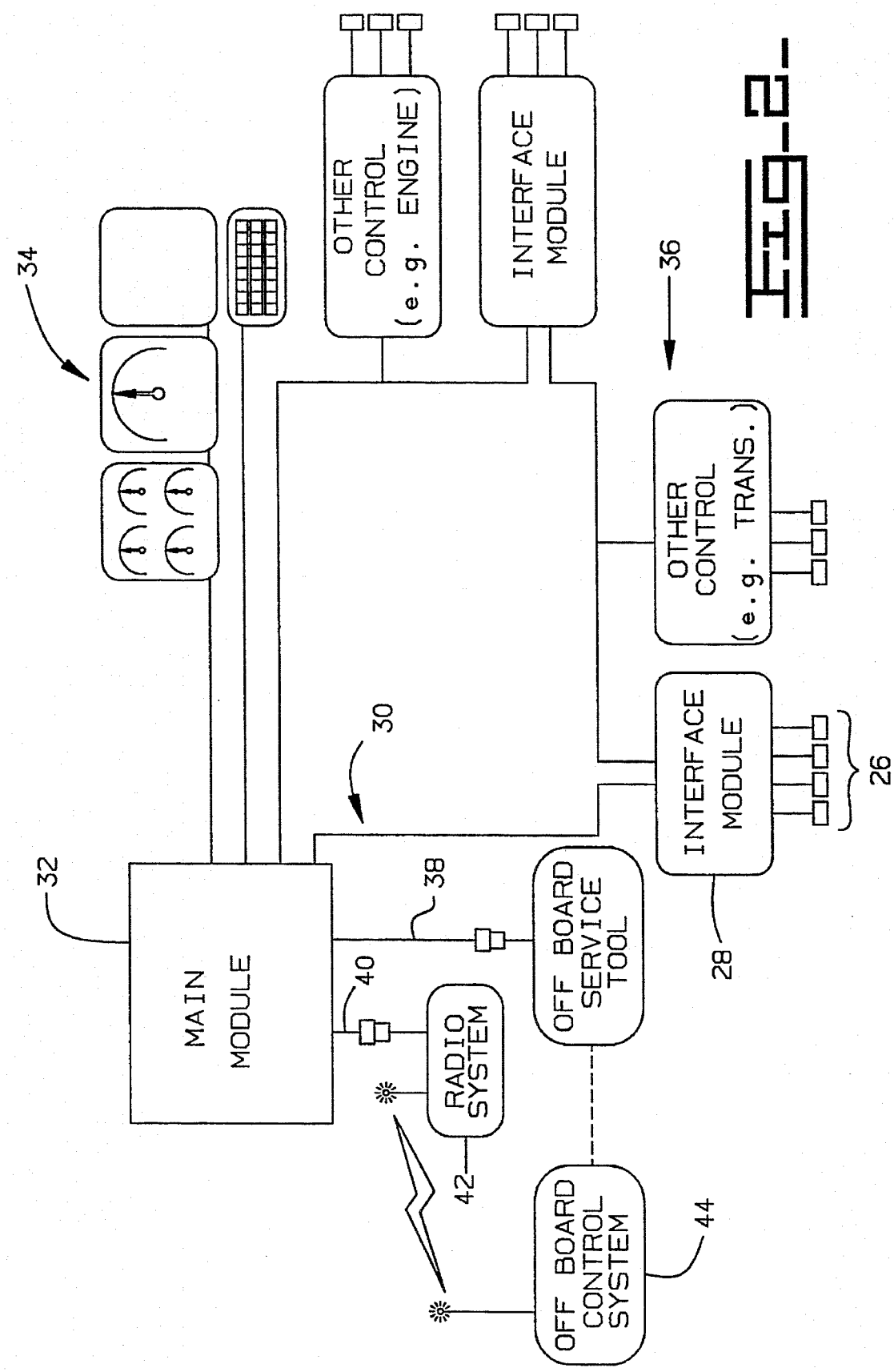
FIG. 2 is a block diagram of a preferred embodiment of an apparatus for monitoring vehicle parameters.

A block diagram illustrating certain electrical and electronic portions of the apparatus 10 is shown in FIG. 2 and illustrates pressure sensors 26 for each of the struts which deliver a plurality of signals each having a value responsive to the internal pressures of a respective suspension strut 14,16. The plurality of pressure sensors 26 are of a type commercially available and are respectively associated with the two front struts and the two rear struts. Each of the pressure sensors 26 delivers an analog signal proportional to the magnitude of the pressure of the respective strut to an interface module 28.

Data from the pressure sensors 26 and other parameter sensors is gathered by the interface modules 28 that communicate the data in digital form by a high-speed communication ring 30 to a main module 32, where data is manipulated and stored until downloaded to an off-board control system 34. It should be noted that while this describes the preferred embodiment, other suitable hardware arrangements may be used without deviating from the invention.

Data and warnings are also transmitted from the main module 32 to a display module 34 for presentation to the operator in the form of gauges and warning messages. In the preferred embodiment, the display module 34 is the standard gauge, warning, and information delivery package available on machines of this type. During normal operation, gauge values are displayed on the display module 34. During out-of-spec conditions, alarms and warning/instructional messages are also displayed. A keypad is provided to allow entry of data and to allow system-level requests in the absence of a service tool. A message area is provided and includes a dot-matrix LCD to display text messages in the memory-resident language and in SI or non-SI units. A dedicated backlight will be employed for viewing this display in low ambient light conditions. The message area is used to present information regarding the state of the machine.

By way of example, warning lights and/or warning messages are displayed to the operator by the display module 34 whenever damaging stresses occur or when damage to the frame is anticipated. For example, a warning light is illuminated when a significant stress is applied to the frame thereby informing the operator that his operation of the machine should be modified or he should notify the mine manager of poor haul road conditions. Similarly, a message is displayed on the dot-matrix LCD to inform the operator that the load is positioned such that dumping could cause frame damage.

While the main, interface, and display modules 32, 28, 34 comprise the baseline machine monitoring system, additional on-board controls 36, such as engine and transmission controls, are typically integrated into this architecture via the communication ring 30 in order to acquire the additional data being sensed or calculated by these controls and to provide a centralized display and storehouse for all on-board controls' diagnostics.

Two separate serial communication lines are provided in connection with the main module 32. One line 38, intended for routine uploading and downloading of data to a service tool, will feed two serial communication ports, one in the operator compartment and one near the base of the machine. The second serial line 40 feeds a separate communications port intended for telemetry system access to allow the main module 32 to interface with a radio system 42 to transmit machine warnings and pressure and/or strain data off-board and to provide service tool capabilities via telemetry. Thus the main module 32 is capable of communicating with an off-board system 44 via either a direct, physical communication link or by telemetry. In the preferred embodiment, the off-board system 44 includes a microprocessor and is advantageously a commercially available work station; however, other types of microprocessor-based systems capable of sending and receiving control signals and other data may be used without deviating from the invention.

Turning now to the method of obtaining values indicative of frame stress in response to sensed parameters, a matrix of equations is required. In the preferred embodiment, the matrix of equations is defined as follows:

$$[A]\{f\}=\{\epsilon\}$$

where:

[A] is the matrix of equations defining pressures as a function of stresses;

$\{f\}$ is a n×1 matrix of unknown stresses; and $\{\epsilon\}$ is a m×1 matrix of known pressure values obtained from the pressure sensors 26.

Since one of the objects of the disclosed apparatus is to obtain data indicative of frame stresses without having numerous strain gauges located at various places around the vehicle and further because suspension strut pressure signals are already available on the machine for reasons such as payload monitoring, it is advantageous to manipulate the equations such that the strain values can be obtained from the already available pressure signals. To obtain the unknown stress matrix $\{f\}$, the [A] matrix must be manipulated to obtain a [B] matrix where:

$$[B]=([A]^T[A])^{-1}[A]^T.$$

Thus:

$$\{f\}=[B]\{\epsilon\}$$

As is well-known in the art, this is referred to as the least-squares technique for solving a system of equations. If the inverse of a matrix is obtained, some of the resulting equations may not provide valid results. This effect can be minimized by known methods of insuring that the equations are independent. The more independent the equations in the [A] matrix, the more likely that the equations of the [B] matrix will provide valid results. Some of the known methods of ensuring independence include examining the slope values of the matrix, the correlation of matrix values, the row dot products of slope values, the column dot products of slope values, etc. Equations that are dependent on other equations may be eliminated or a single equation may be written to replace two or more similar equations. Ultimately, the necessary level of independence is determined empirically and by trial and error to ensure that the equations used provide valid results.

In the preferred embodiment, the coefficients in the [A] matrix are empirically determined. The initial equations and coefficients are selected by using a multilinear regression of experimental load and strain data. The data utilized in the derivation of equations is provided by the pressure sensors 26 and a series of rosette strain gauges capable of providing two-dimensional strain data. One of the strain gauges is located in each of the areas of interest on the frame. Advantageously, many strain gauges are located at numerous positions about the main frame 20. The empirically determined equations are then examined and only those having a significant correlation are selected for the next steps.

The selected equations are then further manipulated by the above described methods to arrive at a [B] matrix having valid equations. The system of equations used in the present invention preferably include four different pressure signals and six different strain locations positioned about the main frame 20. The pressure signals are taken from each of the four suspension struts 14,16 and the strain locations are selected as being located at the fore/aft transition casting, the dead chicken casting, the center cross tube transition casting, the base pedestal area, the banjo housing, and the body pivot casting.

It should be understood, however, that the present invention is in no way limited to this number or location of strains. In fact, for each type of machine or frame, the parameters required to provide a useful [B] matrix will vary and must be empirically determined based on experimental data relating loads to frame stresses. The present invention should similarly not be limited to the main frame; the same methods are equally useful for virtually any structural component for which fatigue life is an important consideration.

In an alternative embodiment, the [A] matrix is obtained through a three dimensional mathematical model of the work machine developed to simulate transient structural deformation and suspension response. The model incorporates compliant (finite element) representations of the truck frame, dump body, and rear axle housing into a dynamic mechanical system simulation model.

In the model, frame acceleration, axle housing elastic deformation (strain), and suspension response (strut pressures and displacements) are correlated with measured data from pressure sensors and a plurality of accelerometers located on the frame. The accelerometers (not shown) are input to the system via the interface module in a manner similar to the pressure sensors 26. In the preferred embodiment, the forward accelerometer location is near the middle of a forward transverse beam which is under the engine. This location is on the left-to-right centerline of the truck. The rear location is near the dump body rear pivot point on the left hand side of the truck.

In this embodiment, the flexible body components are included in a large motion, multi-component, integrated, system dynamic analysis program. The equation of motion formulation is the governing mathematical representation of the flexible body component motion reflecting the integration of large global displacement with linear structural deformation. The legitimacy of the mathematical formulation is determined empirically.

The term "flexible body" as used herein refers to an entity that can experience large spatial motion while deforming elastically. The dynamic equations for a flexible body represent the motion of a set of node points defined relative to a body reference coordinate system which can translate and rotate in a global inertial reference frame. The fundamental elastic relationships are defined by the node coordinates and the mass, damping and stiffness matrices acquired through finite element modeling of the structure. The extension of these linear relationships to incorporate large nonlinear motion proceeds as follows.

Figure 6:
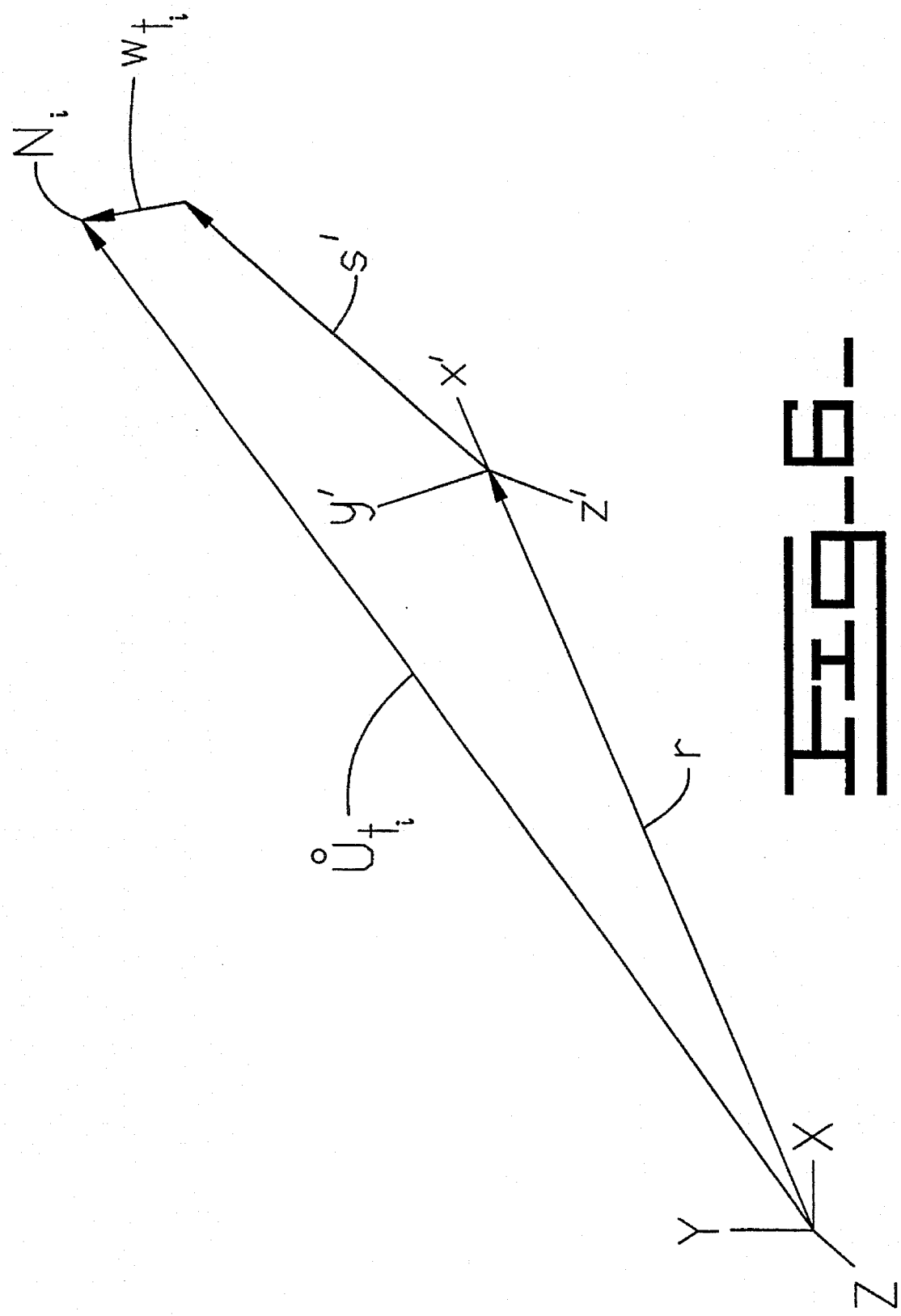
FIG. 6 is a vector diagram of a generic elastic body.

Consider the generic elastic body in FIG. 6. Given an arbitrary node, $N_i$, which prior to deformation has body referenced position coordinates $s'_i$ and has deformed in translation by $w'_{t_i}$ relative to $s'_i$, the global position, $u_{t_i}$, is given by:

$$u_{t_i} = r + A(s'_i + w'_{t_i})$$

where r is the global position of the body reference frame and A is the rotation matrix which maps vectors in the body reference to the global reference. Differentiating with respect to time produces the global nodal velocity, i.e.

$$\dot{u}_{t_i} = \dot{r} + \dot{A}(s'_i + w'_{t_i}) + A\dot{w}'_{t_i}$$

Furthermore, given an arbitrary body referenced vector, v, it can be readily shown that $$\dot{A}v = A(\omega' x v) + A\tilde{\omega}'v$$

which represents a mapping into the global system of the body angular velocity, $\omega'$, crossed into the vector, v. The tilde symbol in the latter form is the skew symmetric matrix of $\omega'$ terms which produces the cross product when post-multiplied by v.

Applying this relation yields the following for $\dot{u}_{t_i}$:

$$\dot{u}_{t_i} = \dot{r} + A[\tilde{\omega}'(s'_i + w'_{t_i}) + \dot{w}'_{t_i}]$$

It is desirable to have the nodal velocity defined in the body system prior to defining momentum because the finite element matrices are body system defined. Pre-multiplying the above equation by the transpose of the rotation matrix yields the body system nodal translational velocity:

$$\dot{u}'_{t_i} = A^T \dot{r} + \tilde{\omega}'(s'_i + w'_{t_i}) + \dot{w}'_{t_i}$$

Now consider the body system nodal rotational velocity which is given by the less complicated relation:

$$\dot{u}'_{r_i} = \omega' + \dot{w}'_{r_i}$$

for which the subscript r indicates rotation.

For simplicity, translational and rotational vector quantities are combined as:

$$\dot{u}'_i = \begin{pmatrix} \dot{u}'_{t_i} \\ \dot{u}'_{r_i} \end{pmatrix}$$

$$w'_i = \begin{pmatrix} w'_{t_i} \\ w'_{r_i} \end{pmatrix}$$

Making no assumptions about the structure of the finite element mass matrix, the nodal momentum vector is, in general, a function of all nodal velocities. Therefore, for a finite element model having n nodes, the body system momentum for node $N_i$ is given by:

$$p'_i = \sum_{j=1}^{n} M_{ij} \dot{u}'_j$$

where $M_{ij}$ represents the partition of the mass matrix with rows corresponding to node $N_i$ and columns corresponding to each node $N_j$. The nodal inertial load is obtained by differentiating in time the momentum, however, the momentum must first be referenced to the inertial coordinate system.

Introducing a 6×6 rotation matrix $A_g$ as:

$$A_g = \begin{bmatrix} A & O \\ O & A \end{bmatrix}$$

the global nodal momentum for node $N_i$ becomes:

$$p_i = A_g \sum_{j=1}^{n} M_{ij} \dot{u}'_j$$

Differentiating and applying the previously defined relation for $\dot{A}$ yields:

$$\dot{p}_i = \frac{dp_i}{dt} = \dot{A}_g \left[ \tilde{\omega}'_g \sum_{j=1}^{n} M_{ij} \dot{u}'_j + \sum_{j=1}^{n} M_{ij} \frac{d\dot{u}'_j}{dt} \right]$$

Differentiation of the body referenced nodal velocity, $\dot{u}'_j$ is straight forward and will not be performed here.

The nodal inertial load, $f'_i$, referenced to the body orientation is obtained by mapping this quantity into the body system. Hence:

$$f'_{i_j} = \dot{p}'_i = \bar{\omega}'_g \sum_{j=1}^{n} M_{ij} u'_j + \sum_{j=1}^{n} M_{ij} \frac{du'_j}{dt}$$

Damping and elastic nodal loads are much more easily defined because they are related only to the linear deformation quantities. Those quantities identified as $f'_{d_i}$ and $f'_{e_i}$ are:

$$f'_{d_i} = \sum_{j=1}^{n} B_{ij} \dot{w}'_j$$

$$f'_{e_i} = \sum_{j=1}^{n} K_{ij} w'_j$$

where $B_{ij}$ and $K_{ij}$ are respectively partitions of the damping and stiffness matrices.

The dynamic nodal equations which represent a vector force balance referenced to the body system are:

$$f'_{i_j} + f'_{d_i} + f'_{e_i} - f'_{a_i} = 0$$

where $f'_{a_i}$ represents the vector sum of external loads applied to node $N_i$. Grouping the nodal equations for all nodes yields the system equations for the structural member.

Figure 3:
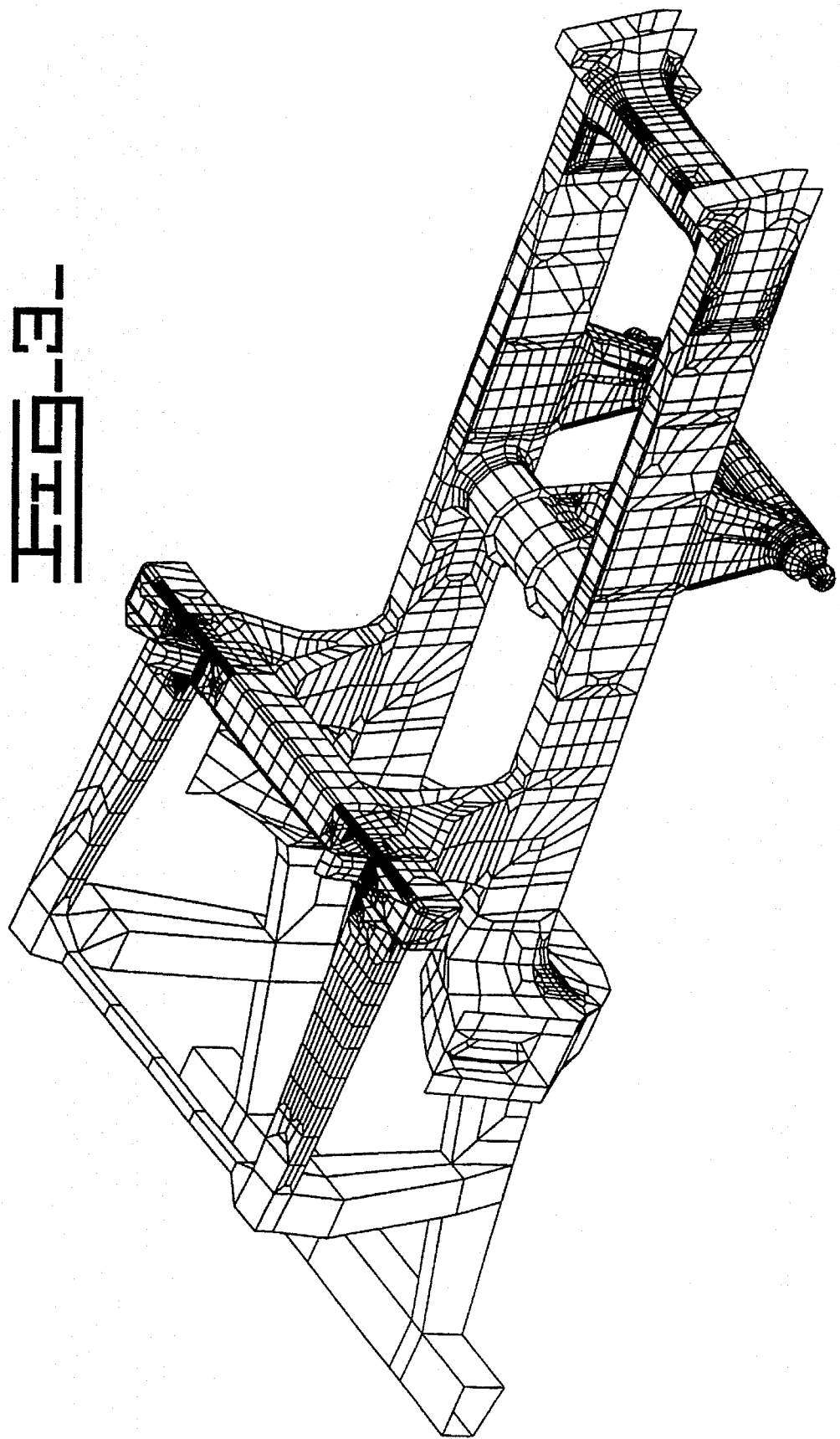
FIG. 3 is a diagrammatic view of finite elements of a main frame for an off-highway truck.
Figure 4:
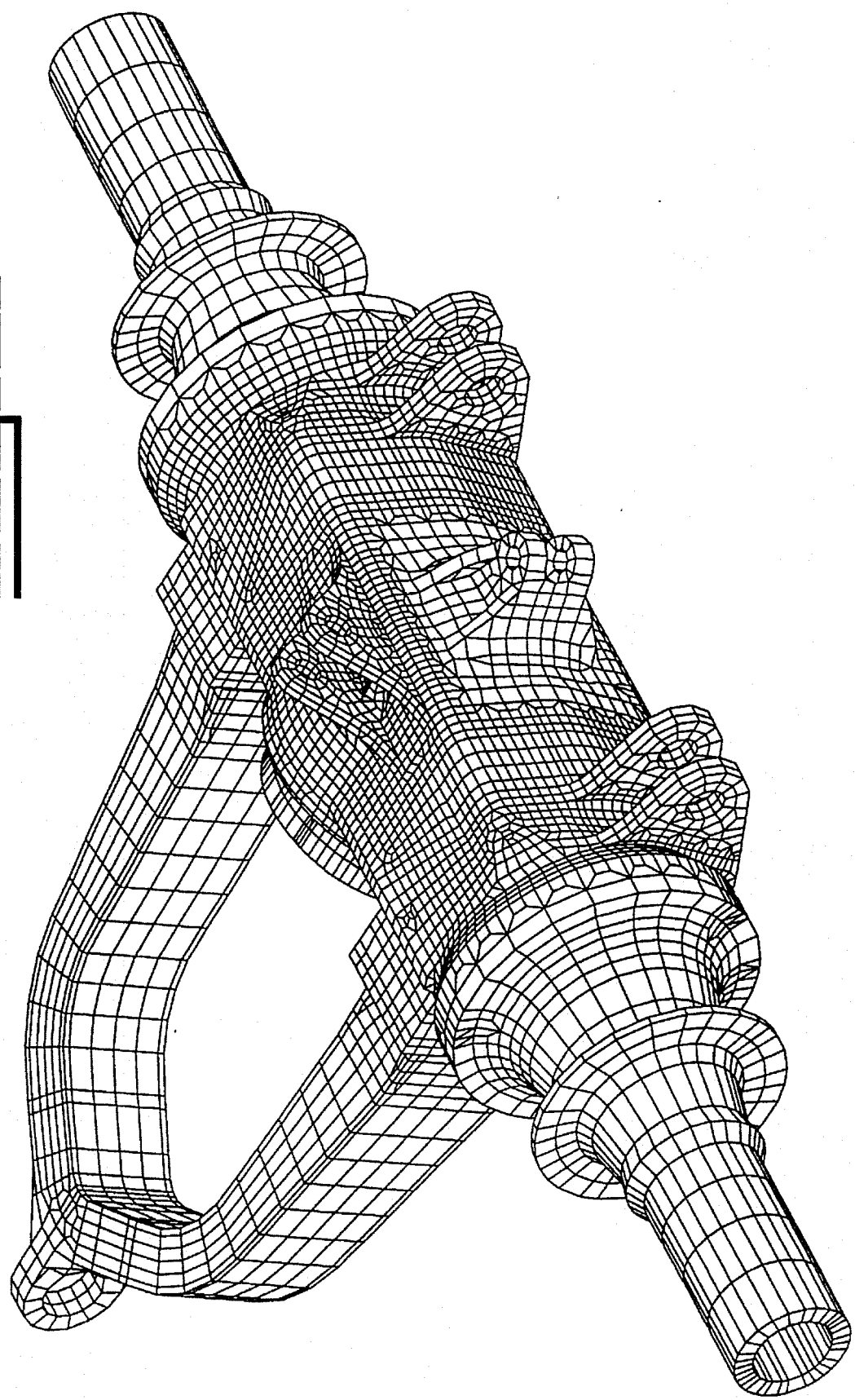
FIG. 4 is a diagrammatic view of finite elements of an A-frame/banjo housing for an off-highway truck.
Figure 5:
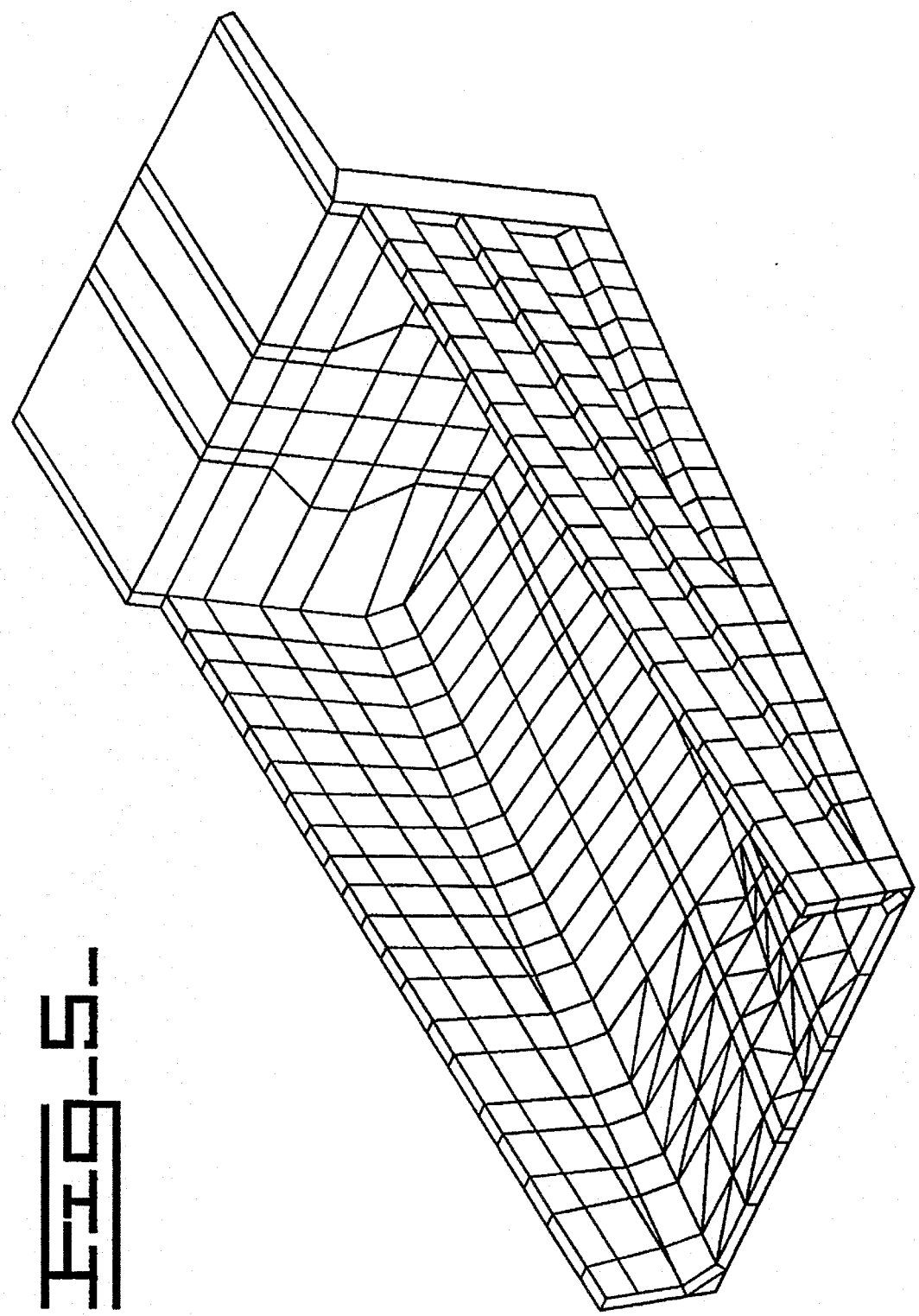
FIG. 5 is a diagrammatic view of finite elements of a dump body for an off-highway truck.

The major structural assemblies of the truck are modeled as flexible bodies. The structural characteristics of these components are derived from finite element analyses. The finite element model of the main frame is shown in FIG. 3. The finite element model of the A-frame/banjo housing is the most detailed and is depicted in FIG. 4. The dump body model is shown in FIG. 5. The models are analyzed with UAI/NASTRAN (an analysis program developed and maintained by Universal Analytics Inc.) to develop reduced mass and stiffness matrices that are subsequently coupled with the large-motion, transient simulation software program. The system simulation program used in this study is a proprietary software program developed by Caterpillar and is referred to as DYNASTY.

The system model is assembled by joining the flexible bodies at appropriate locations with mathematical constraints representing the various joints used in the actual truck (e.g., pin, spherical, slider, etc.) The modeling of the suspension cylinders or struts is more involved and is discussed separately. The interconnection of all the components in the idealized model is depicted schematically in FIG. 9. DYNASTY generates and solves the appropriate system equations and equations of motion based on the type of component selected and the connections among the components.

The intermittent stick-slip behavior caused in the front strut by the sliding pillar arrangement, in combination with other aspects of the strut such as seal drag, compression of the oil-nitrogen mixture, and pressure losses through the various orifices, results in a component with highly nonlinear behavior. The mathematical model of this component includes approximations for all of these effects. Because of the difference in mounting, the rear strut does not suffer from the stick-slip behavior.

The compression of the oil-nitrogen mixture is assumed to be an adiabatic process. For short duration events the compression of the mixture is more accurately described as adiabatic rather than isothermal. The events typically encountered by off-highway trucks are fairly short in duration with the response from a single event typically decaying in less than ten seconds.

The numerical values for the numerous parameters used in the equations are preferably estimated from various sources. Flow loss coefficients are derived from hydraulic system design references, coefficient of friction values are determined from bench testing, oil-nitrogen mixture properties are extrapolated from equations describing the behavior of oil with entrained air. Other parameters are determined from geometry of the actual parts. Advantageously, these parameters are varied systematically to determine their impact on simulation results. This information helps identify which parameters are critical and/or those that might require further evaluation.

It should be further noted that due to the processing power required for the embodiment using the three dimensional compliant model to obtain the [A] matrix, the input pressure and acceleration data in this embodiment is advantageously downloaded via the radio system 42 to a microprocessor-based workstation located remotely from the off-highway truck. The remotely located workstation is then used to perform the processing described herein.

This embodiment provides a matrix of equations providing strain data in response to strut pressure and frame accelerations. By inputting pressure and acceleration data, strain data is produced that can be used as described below to obtain indications of the severity of stresses being imparted on the machine.

The variables associated with the description of this particular embodiment are defined as follows:

A—body vector to global vector rotation matrix $\dot{A}$—time derivative of rotation matrix A $A_g$—a 6×6 matrix with A as its diagonal partitions $A^T$—transpose of A $B_{ij}$—partition of damping matrix with rows corresponding to node $N_i$ and columns to $N_j$ $f'_{a_i}$—externally applied force applied to node in body reference system $f'_{d_i}$—damping force for node $N_i$ in body reference system $f'_{e_i}$—elastic force for node $N_i$ in body reference system $K_{ij}$—partition of stiffness matrix with rows corresponding to node $N_i$ and columns to $N_j$ $M_{ij}$—partition of mass matrix with rows corresponding to node $N_i$ and columns to $N_j$ $N_i$—finite element node having sequential number i $p_i$—general vector momentum for node $N_i$ in global system $\dot{p}_i$—time derivative of $p_i$ $p'_i$—general vector momentum for node $N_i$ in body system $\dot{p}'_i$—time derivative of $p_i$ r—position of body coordinate system relative to global inertial reference $\dot{r}$—global translational velocity of body coordinate reference $s'_i$—undeformed position of node $N_i$ in the body coordinate system $\dot{u}'_i$—general velocity vector or node $N_i$ in body system $\dot{u}'_{r_i}$—rotational velocity of node $N_i$ in body system $\dot{u}_{r_i}$—global rotational velocity of node $N_i$ $\dot{u}_{t_i}$—global position of node $N_i$ $\dot{u}_{t_i}$—global translational velocity of node $N_i$ $\dot{u}'_{t_i}$—translational velocity of node $N_i$ in body system v—arbitrary 3×1 vector $w'_i$—general deformation vector of node $N_i$ in the body coordinate system $\dot{w}'_{r_i}$—rotational deformation velocity of node $N_i$ in the body coordinate system $w'_{t_i}$—translational deformation of node $N_i$ in the body coordinate system $\dot{w}'_{t_i}$—time derivative of $w'_{t_i}$ x—indicates vector cross product $\omega'$—angular velocity vector of body reference in body coordinates $\tilde{\omega}'$—matrix cross product form of $\omega'$ such that $\tilde{\omega}'V = \omega' \times V$ $\tilde{\omega}'_g$—a 6×6 matrix with $\tilde{\omega}'$ as its diagonal partitions O—a 3×3 null matrix Turning now to the description of the quantification of frame stress, and more particularly to FIG. 10, raw data produced by the pressure sensors 26 and the strain values obtained by multiplying the pressure matrix by the [B] matrix is graphically shown. In the preferred embodiment, the pressure data is sampled at a rate of 10 Hertz and each of these samples is applied to the [B] matrix to obtain corresponding strain data. For a predetermined amount of time, a rainflow histogram is produced for each pressure sensor and each strain location. Alternatively, the histogram could be produced once during each haul cycle or portion of the haul cycle. Each rainflow histogram is then converted to a Fatigue Equivalent Load Analysis (FELA) value. Each of the FELA values are then combined to form a composite FELA value representing the severity of the frame damage occurring during that period.

Turning now to FIGS. 11 and 12, the derivation of the FELA values is described. Rainflow histograms of a type well-known in the art are developed for each of the pressures and strains based on the raw data. To calculate the FELA values, the processor normalizes the histogram bounds to range from 0 to 1 and then calculates the damage rate for each cell where:

damage rate=((number of counts)×(center of range)×(sn slope)/(histogram time))

where:

number of counts=represents the number included in a particular range in the rainflow histogram.

center of range=midpoint of values defining a particular range in the rainflow histogram.

sn slope=a material dependent property illustrated in FIG. 11 as the inverse of the slope of the line defining a particular material on a load (log) vs. cycles (log) graph. In the preferred embodiment, the selected material is weld and has as n slope of approximately 3.

histogram time=the length of time during which the data in the histogram was acquired.

This damage rate vector is then converted into a normalized cumulative rate array. This is plotted in FIG. 12 as y(x). For a given value of the normalized histogram bounds, x, the z(x) value is calculated as follows:

$z(x)$=(endurance limit cycles)×($X^{sn\ slope}$)/(total damage)/(life goal)

where:

endurance limit cycles=a design parameter being dependent upon material properties and design choice with respect to desired life. In the preferred embodiment, endurance limit cycles is set conservatively at 10 million cycles;

sn slope=as defined above;

total damage=sum of damage rates for all cells; and life goal=desired life of the structural component of interest. In the preferred embodiment, this value was conservatively selected as 10,000 hours.

The FELA is then the x-value at the intersection between the two curves, y(x) and z(x). This value is represented by $X_{int}$ in FIG. 12. The value of $X_{int}$ is then converted from its normalized value back into its real value and returned as the FELA value. The composite FELA is the sum of the FELA values for each parameter (pressures and strains).

As shown in FIG. 11, the load corresponding to the load at the endurance limit cycles represents the threshold for purposes of this model below which a load is considered to not cause damage to the structure. This load is known as the endurance limit load and corresponds to the FELA. Of course, all forces contribute to fatigue damage to a degree; however, values below this threshold have such a slight effect that they can be discarded as insignificant. By discarding these values, a significant amount of processing time is also conserved since most of the counts in the histogram are included in the ranges that do not significantly affect frame life. While the FELA derivation was described in connection with pressures and loads, it should be understood that FELA values are calculated for strains in a similar manner.

An algorithm used in connection with an embodiment of the invention is illustrated in FIG. 13. Once the desired amount of raw pressure data and strain values are stored in a buffer in the memory within the main module, the processor defines the rainflow ranges in a manner well-known in the art and builds a one-way rainflow histogram. For each of the parameters (pressures and strains), FELA values are calculated as described above. The composite FELA is computed as the sum of all of the individual FELA values for the set of histograms being processed.

An optimized peak-valley cut-off value is also calculated for each of the parameters for use in the compression algorithm to be described below. If the peak-valley cut-off value is selected as being too small, then too much memory space will be required to store the relevant data; however, if the peak-valley cut-off value is too large, then a significant amount of relevant data will be discarded. In the preferred embodiment, the peak-valley cut-off value for each histogram is selected to be equal to its corresponding FELA value.

Since data is acquired 10 times per second, any reasonable amount of memory would be quickly consumed if all pressure and strain data was stored. Consequently, it is desirable to store only that data that is required to represent the significant frame damage events. If the FELA is the largest one seen by the processor, then the FELA value is stored and all of the pressure values are also stored for the time period represented by the histogram. The strain data is not stored since it can always be reproduced by multiplying the stored pressure vectors by the [B] matrix.

If the FELA is one of the N largest FELA values, then the FELA value is stored. The value of N depends upon the amount of memory allocable to data storage of this type. If the FELA is one of the (N–M) largest FELA values, then the data is compressed and stored. The value of (N–M) corresponds to the number of records for which compressed data is to be stored and is dependent upon the amount of memory allocable of data storage of this type.

The compressed data to be stored for the (N–M) largest FELA values is obtained by first locating the peaks and valleys for each parameter that exceeds the optimized peak-valley cut-off for that parameter. The time of each of these peaks and valleys is noted for each parameter. All pressures that were sampled at a point in time corresponding to one of the noted peak-valley times are stored in memory. Thus, only snapshots of data corresponding to significant frame stress events are stored. Typically, this method of compression achieves a compression ratio of roughly 40:1.

Figure 14:
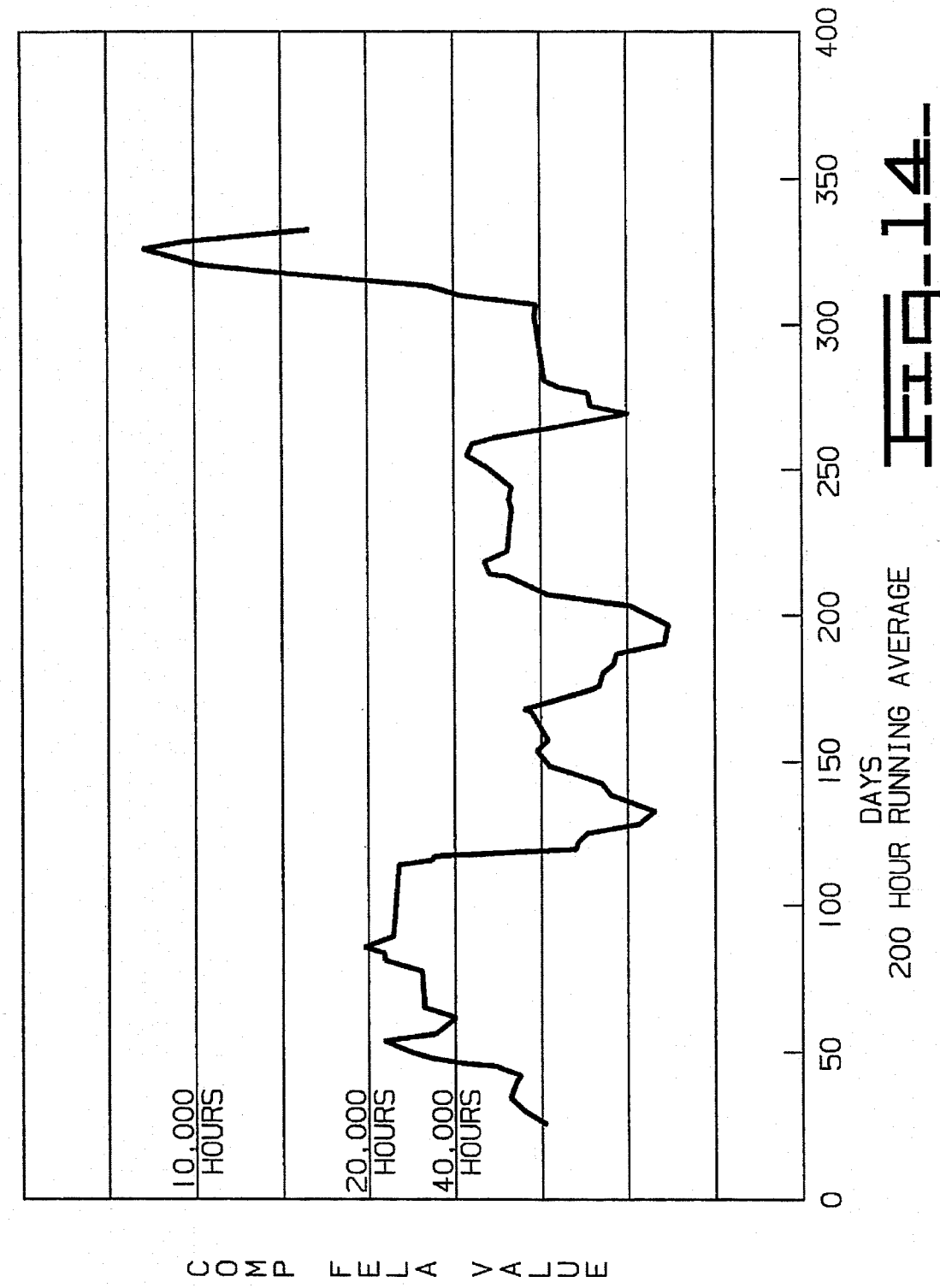
FIG. 14 is a graph of historical composite FELA values.

FIG. 14 represents a graphical illustration of 200 hour running averages of composite FELA values and illustrates one particular use for the data obtained via the above described method. For example, if data is stored in the main module or is transferred for storage to a remotely located processor via either a telemetry system or portable download device, then historical FELA data can be plotted to indicate trends in the severity of frame damage being undergone by that particular machine. These trends could be caused by any number of reasons including weather conditions that degrade underfoot conditions, inadequate maintenance of haul roads, hiring an inexperienced driver who is abusing the machine, etc.

The FELA values can also be used to obtain expected frame life if a particular level of damage is continued. These figures are arrived at by back calculating through the above formulas for calculating FELA values. Such figures provide work site managers with a meaningful number with which to manage work site conditions.

For example, consider the right-most peak in FIG. 14. If operating conditions continue at that level of frame stress, the mine manager can only expect the fatigue life for that machine to be 10,000 hours rather than the 40,000 hour life available from a lesser amount of stress. Based on this figure, the mine manager can quantify the relative costs and benefits of spending additional money to improve haul road maintenance.

In addition to the FELA and fatigue life values, the present invention can be used to provide warnings directly to the machine operator or to the mine manager indicating that the machine is undergoing, or will soon undergo, an operation causing significant frame damage. By analyzing graphical and other historical representations of FELA values, particular operations or operating conditions can be identified that result in significant frame damage. For example, if the historical data representing all of the strut pressures corresponding to a particularly large FELA value are analyzed, it may be seen that significant frame damage is caused when there are large differences between the left strut pressure and the right strut pressure.

Figure 15:
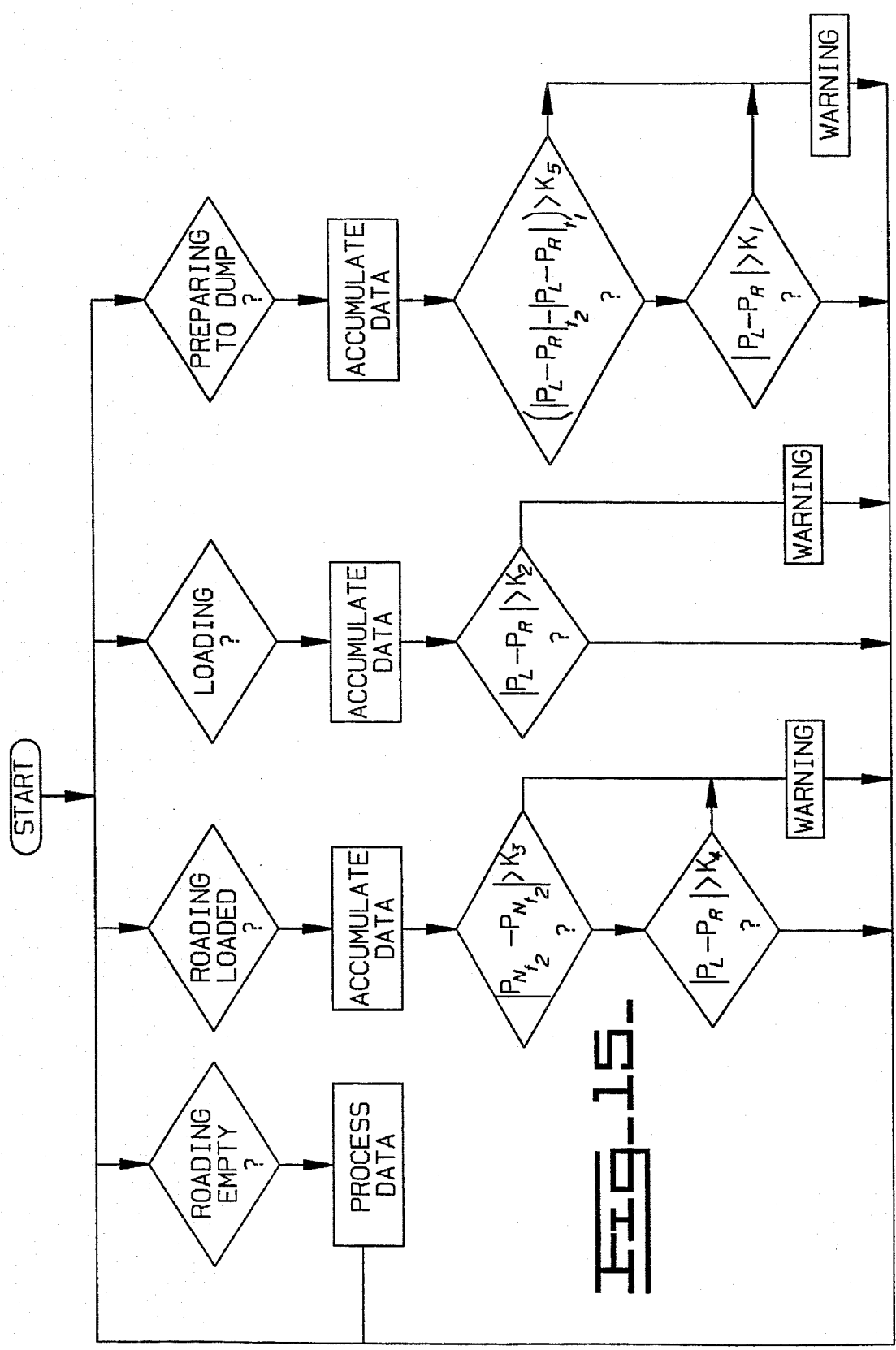
FIG. 15 illustrates a flow chart for an algorithm used in connection with an embodiment of the present invention.

FIG. 15 illustrates an algorithm included in an embodiment of the present invention. The type of processing being carried out and the warning condition definitions vary depending upon which portion of the haul cycle is being performed. The particular portion of the haul cycle is determined by known methods of referring to weight, location at the work site, transmission gear, certain types of gear shifts, etc. For example, if the off-highway truck is backing up while the machine is loaded, it is assumed that the operator is preparing to dump. Similarly, a gear shift from reverse to neutral could be viewed as an indication that the operator is now going to dump. If the pressure sensors register regular and significant increases in payload while in neutral, it is assumed that the truck is being loaded. Furthermore, systems are available in which the machine operator makes an entry to a control panel indicating that he is presently at the loading station or at the dump site.

If the off-highway truck is being roaded empty, then it is assumed that no significant frame damage is taking place. Thus, no pressure data is stored. During this time, the calculations of the strains, the FELA values, and the composite FELA values are advantageously carried out since a significant amount more processing capacity is available during this period than during other portions of the haul cycle. This is because there is no processing required for warnings during this time and because the pressure data is not being stored.

If the off-highway truck is travelling while loaded, then pressure data is accumulated and warnings are produced if significant pressure spikes are sensed or if differences between the left and right strut pressures exceed a predetermined constant chosen to correspond to a minimum level at which significant frame damage results. The warning produced is advantageously a warning light visible to the machine operator. This warning could be supplemented by a warning horn if a condition in which the frame damage is especially high is encountered. Thus there could be multiple thresholds of warning conditions which cause different types or levels of warnings.

Alternatively, a row of LEDs or other illuminable devices could be included in the operator's compartment which progressively illuminate from green to amber to red depending upon the severity of the stress level. In addition to the operator warnings, warnings could be transmitted to the mine manager via the telemetry system to indicate that additional road maintenance is required.

Figure 16:
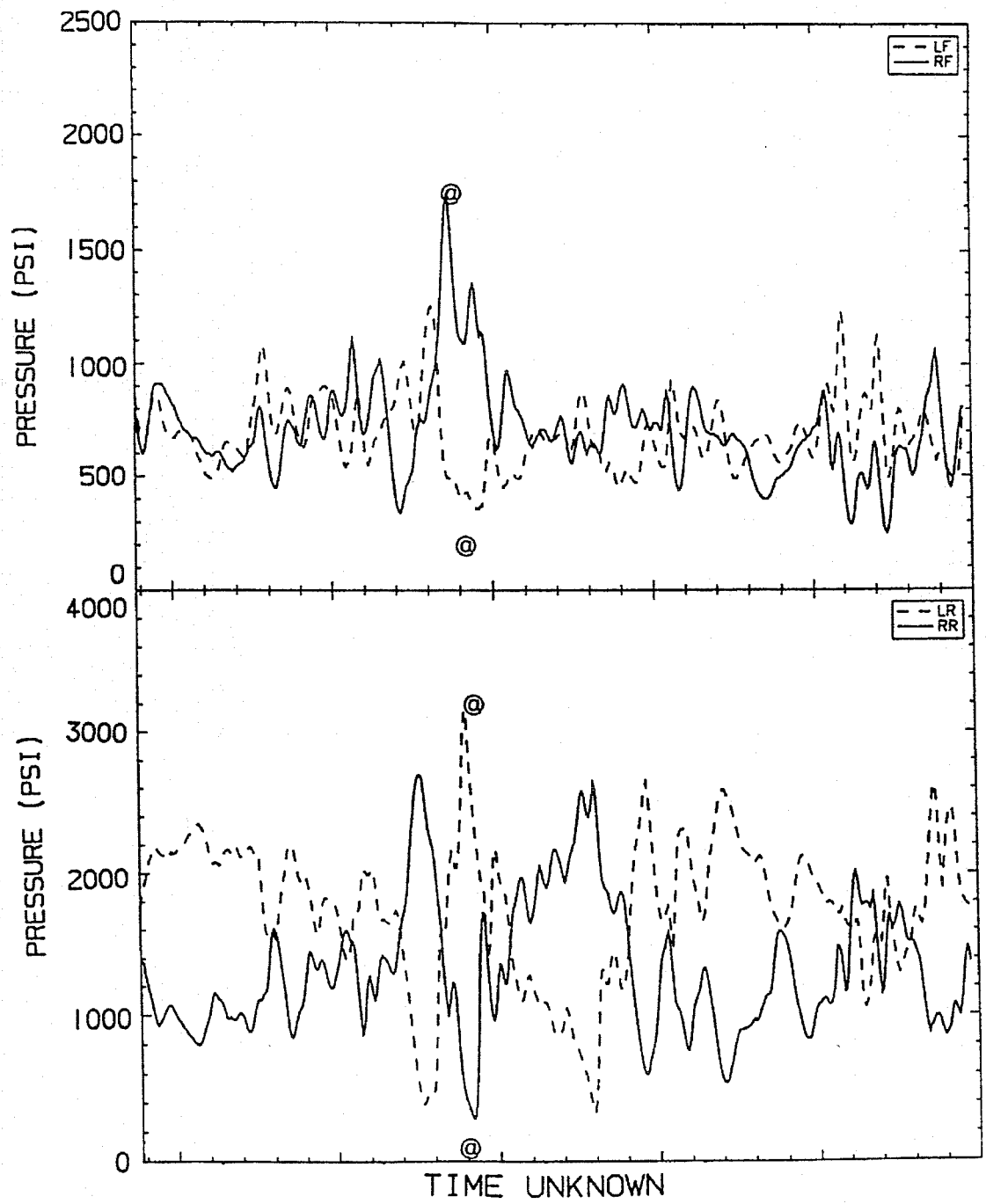
FIG. 16 is a graph of strut pressures during a roading loaded portion of an off-highway truck hauling cycle.

FIG. 16 illustrates data acquired while roading the truck when loaded. The section marked by the "@" would cause a warning to be indicated since it indicates significant differences between the left and right strut pressures. As shown, some difference between the left and right strut pressures exists during nearly the entire period illustrated. To determine which of the conditions cause sufficient damage to justify a warning, the FELA values associated with roading the truck when loaded must be examined and correlated with strut pressure differences occurring during periods when high FELA values were recorded.

If the off-highway truck is being loaded, then pressure data is accumulated and a warning is produced when the difference between right and left strut pressures exceed a predetermined constant. These warnings could be illustrated using any of the above methods of indicating warnings to the operator or mine manager. Alternatively, this warning could be transmitted via the telemetry system to the operator of the machine loading the truck.

Figure 17:
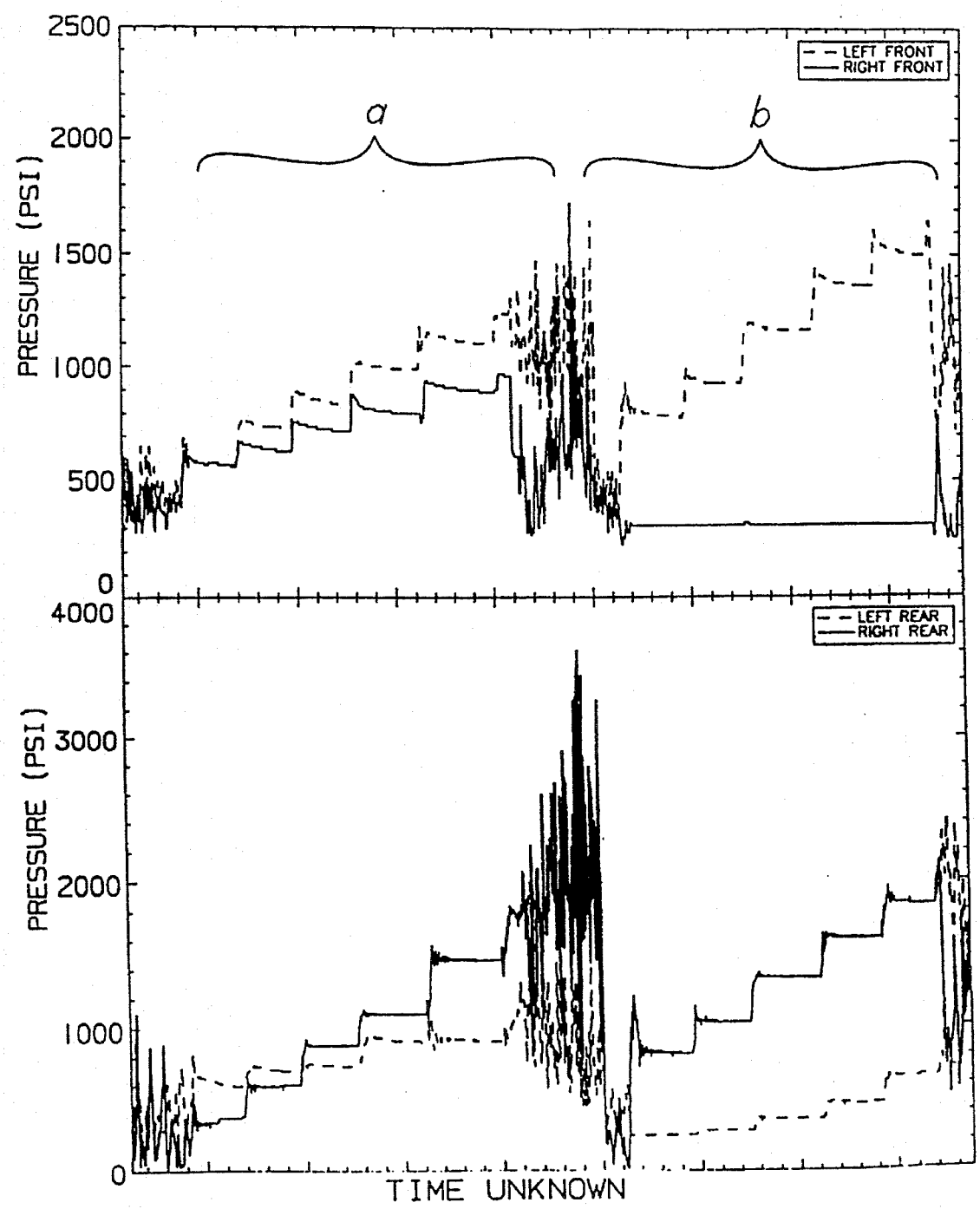
FIG. 17 is a graph of strut pressures during the loading portion of an off-highway truck hauling cycle.

As shown in the graphs of FIG. 17, the region of the graphs marked by the letter "a" represents strut pressures during which relatively little stress is caused on the frame; whereas the region marked by the letter "b" represents a loading cycle in which there are extremely large differences between the left and right strut pressures. Situations such as that indicated in region "b" cause significant frame stress due to the large twisting moments imparted on the frame. The warning thresholds for the loading portion of the hauling cycle would therefore be set such that a warning light would be illuminated in region "b" but not in region "a". Note that some differences in left-right strut pressures are inevitable and that only the most severe cases are indicated as warnings. The threshold is set after reference to corresponding FELA values as described above.

If the truck is preparing to dump, then pressure data is accumulated and warnings are advantageously provided if the difference between right and left strut pressures exceed a predetermined constant or if the difference between left and right strut pressures is becoming progressively larger. The latter situation would indicate that the truck is backing into a position that is becoming progressively worse, e.g. one of the wheels if rolling into a hole or over a boulder.

The thresholds for the warnings may be lower during the dumping portion than other portions of the dump cycle because some of the most significant stresses are caused when the dump body is in the raised position and substantially all of the load is concentrated on the rear of the main frame.

In FIG. 18, the portion marked by the letter "a" indicates a relatively high stress dump cycle, and the portion marked by the letter "b" indicates a relatively low stress dump cycle. The high twisting moment imparted on the rear of the frame during the "a" dump is indicated by the relatively enormous difference between the left and right strut pressures on the rear of the truck. Note that the "b" dump has differences that are inevitable in nearly every dump, but these differences are substantially smaller than in the "a" dump. The FELA values calculated during each of these and other dump cycles are used to select which of the dumps caused significant frame damage and therefore where the warning threshold should be placed.

INDUSTRIAL APPLICABILITY

In operation, the present invention is used as a work site management tool and to provide information to the driver allowing him to correct his use of the load hauling machine to improve expected vehicle frame life. Reports of frame stress data are referred to by mine management personnel to view trends in frame damaging events and to make judgements regarding haul road maintenance and operator abuse.

Warnings are provided to the operator to provide indications of his own operation of the truck that contributes to a reduction in expected frame life. Furthermore the severity of various events can be judged so that future driving can be compensated to avoid additional damage.

The frame stress data used to provide the above reports and warnings are obtained by measuring and processing suspension strut pressures. Values falling below a predetermined threshold are discarded to reduce the amount of processing required. Since events falling below the threshold do not substantially contribute to frame failure, these discarded values to not reduce the accuracy of frame life predictions.

Individual events are visually indicated to the driver when the estimated stresses are sufficiently high. In the preferred embodiment, different warning levels are provided for estimated stresses of different levels. For example, amber lights may be included in the driver's work area to indicate moderate events, red lights may be used to indicate severe events, and audible warnings may be used in addition to the red lights to indicate extremely severe events.

Data is also accumulated either on-board the vehicle or at a remote site management center. This data is used to provide mine managers with information relating to haul road maintenance, weather effects on frame damage, differences between first, second, and third shift operation, abuse by operator misuse, etc. By way of example, trends can be provided to indicate that frame damage is becoming progressively worse. Such a trend might indicate poor haul road maintenance or reduced operating conditions at the work site caused by the spring thaw.

Any specific values used in the above description are for exemplary purposes only and in no way limit the scope of the present invention. Other aspects and advantages of this invention can be obtained from a study of the drawings, the disclosure, and the appended claims.

We claim:

1. An apparatus for a machine having a ground engaging portion, a frame connected to the ground engaging portion, a plurality of pressure sensing devices connected to and between the frame and the ground engaging portion, each of the plurality of pressure sensing devices being adapted to produce pressure signals indicative of load characteristics, comprising:

a processor means for receiving said pressure signals and responsively calculating one or more estimates of strains occurring on the frame; and means for quantifying frame stress in response to the pressure signals and said estimates of strains occurring on the frame.

2. An apparatus, as set forth in claim 1, wherein said means for quantifying frame stress includes means for producing a plurality of fatigue equivalent load values; and including means for accumulating said fatigue equivalent load values.

3. An apparatus, as set forth in claim 1, including:

means for storing frame stress data; and means for transferring frame stress data to a remote location.

4. An apparatus, as set forth in claim 3, wherein said remote location includes a second processor means for quantifying frame life in response to said frame stress data.

5. An apparatus, as set forth in claim 1, including:

means for identifying a frame stress event in response to said pressure signals; and a frame stress indicator for producing a visual indication of frame stress caused by said frame stress event.

6. An apparatus, as set forth in claim 5, wherein said frame stress indicator produces a visual indication of the magnitude of said frame stress event.

7. An apparatus, as set forth in claim 5, wherein said frame stress indicator is located in an operator compartment.

8. An apparatus, as set forth in claim 5, wherein said frame stress indicator is located at a site management center and including a means for transferring frame stress data to said site management center.

9. An apparatus, as set forth in claim 1, including:

means for producing a first warning level signal in response to frame stress exceeding a first level;

means for producing a second warning level signal in response to frame stress exceeding a second level; and means for producing a third warning level signal in response to frame stress exceeding a third level.

10. An apparatus, as set forth in claim 1, including:

means for producing estimated frame life data in response to quantified frame stress data; and means for transferring said estimated frame life data to a site management station.

11. An apparatus, as set forth in claim 1, including means for producing trends of frame stress data.

12. An apparatus, as set forth in claim 1, including:

means for transmitting frame stress data to a remote location; and means for producing a graphical representation of said frame stress data at said remote location.

13. An apparatus, as set forth in claim 1, wherein said processor means includes means for comparing pressure signals from two or more of said plurality of pressure sensing devices and producing a difference signal; and including means for indicating frame stress events in response to differences between the magnitude of pressures in two or more of said plurality of pressure sensing devices.

14. An apparatus, as set forth in claim 1, including means for producing a histogram of said pressure signals.

15. An apparatus, as set forth in claim 1, wherein said means for quantifying frame stress includes means for producing a pressure histogram and a strain histogram in response to said pressure signals; and means for processing said pressure and strain histograms to produce an indication of a severity of frame stresses.

16. An apparatus, as set forth in claim 1, wherein said means for quantifying frame stress includes means for producing a load histogram in response to said pressure signals; and means for processing said load histogram to produce an endurance limit load value.

17. An apparatus, as set forth in claim 1, including a plurality of suspension struts and said pressure signals indicate the pressure within said suspension struts.

18. An apparatus, as set forth in claim 1, wherein said processor means includes a compliant representation of the truck frame incorporated into a dynamic mechanical system model.

19. An apparatus, as set forth in claim 18, wherein said processor means performs fatigue calculations for the frame.

20. An apparatus, as set forth in claim 19, including an accelerometer mounted to said frame for producing acceleration signals and means for delivering said acceleration signals to said processor means for use in fatigue calculations for the frame.

21. An apparatus, as set forth in claim 18, wherein said processor means includes means for determining whether a frame damaging event has occurred; and
a display for indicating frame damaging events.

22. An apparatus, as set forth in claim 21, wherein said display is located in an operator compartment.

23. An apparatus, as set forth in claim 21, wherein said display is located at a site management center and including a means for transferring frame stress data to said site management center.

24. An apparatus, as set forth in claim 1, wherein said processor means includes a three dimensional model of the load hauling machine, said three dimensional model simulating transient structural deformation and suspension response of the load hauling machine.

25. An apparatus, as set forth in claim 24, including means for delivering said pressure signals from said pressure sensors to said processor means for recognizing events contributing to structural damage of said frame.

26. An apparatus, as set forth in claim 24, including means for delivering said pressure signals from said pressure sensors to said processor for use in fatigue calculations for the main structural components of the load hauling machine.

27. An apparatus, as set forth in claim 24, including:
means for delivering said pressure signals from said pressure sensors to said processor means for determining whether a frame damaging event has occurred; and
a display for indicating the severity of each frame damaging event.

28. An apparatus, as set forth in claim 27, wherein said display is located in an operator compartment and indicates the severity of said frame damaging events.

29. An apparatus, as set forth in claim 27, wherein said display is located at a site management center and including a means for transferring frame stress data from the load hauling machine to said site management center.

30. An apparatus, as set forth in claim 1, including:
a motion sensor connected to said ground engaging portion for producing travel signals indicative of movement of the load hauling machine;
means for determining whether the machine is being loaded, dumped, roaded while loaded, or roaded empty in response to said pressure signals and said travel signals; and
means for processing said pressure signals in response to said machine being roaded empty.

31. An apparatus, as set forth in claim 1, including:
means for storing frame stress data and said pressure signals; and
means for storing all of said pressure signals associated with the largest frame stress value produced in a given period.

32. An apparatus, as set forth in claim 1, including:
means for storing frame stress data and said pressure signals; and
means for storing a subset of all pressure signals associated with each of a plurality of frame stress values produced in a given period.

33. An apparatus, as set forth in claim 32, including means for producing a plurality of stress values in response to said pressure signals and wherein each pressure signal in said subset of all pressure signals corresponds to a peak or valley in one of the pressure signals or stress values.

34. A method for analyzing frame damage during operation of a load hauling machine having a plurality of suspension struts, a frame and a load hauling portion, comprising the steps of:
building a system of equations describing a relationship between strut pressure and frame damage;
measuring the amount of pressure in the plurality of suspension struts; and
estimating frame damage in response to the measured strut pressures.

35. A method for analyzing frame damage during operation of a load hauling machine, comprising the steps of:
measuring the amount of pressure in a plurality of suspension struts on the load hauling machine;
calculating difference values representing a difference between pressures in two or more of said suspension struts;
determining a threshold magnitude of strut pressure difference values contributing to frame damage; and
processing strut pressure difference values above the threshold magnitude to produce indications of frame damaging events.

36. A load hauling machine, comprising:
a load carrying portion;
a ground engaging portion;
a frame connected to and between said load carrying portion and said ground engaging portion;
a plurality of pressure sensing devices connected to and between said load carrying portion and said ground engaging portion, each of said plurality of pressure sensing devices being adapted to produce pressure signals indicative of load characteristics;
means for recognizing a frame damage event in response to said pressure signals; and
means for producing an operator warning in response to said frame damage event.

37. A load hauling machine, as set forth in claim 36, including means for obtaining a difference between two of said plurality of pressure signals and wherein said means for recognizing a frame damage event recognizes said frame damage event in response to said difference between two of said plurality of pressure signals.

38. An apparatus, as set forth in claim 36, including means for transmitting a mine manager warning to a remote location in response to said frame damage event.

39. An apparatus, as set forth in claim 36, including:
means for storing said pressure signals; and
means for estimating frame life in response to said stored pressure signals.

40. An apparatus, as set forth in claim 36, wherein the load hauling machine includes a plurality of suspension struts and said pressure signals indicate the pressure within said suspension struts.

41. A load hauling machine, comprising:
a load carrying portion;
a ground engaging portion;
a frame connected to and between said load carrying portion and said ground engaging portion;
a plurality of suspension struts connected to and between said ground engaging portion and said frame;
a plurality of pressure sensing devices connected to said plurality of suspension struts, each of said plurality of pressure sensing devices being adapted to produce pressure signals indicative of suspension strut pressure;
a motion sensor connected to said ground engaging portion for producing travel signals indicative of movement of the load hauling machine;
means for determining whether the machine is being loaded, dumped, or roaded in response to said pressure signals and said travel signals;
means for identifying and indicating a frame damage event in response to said strut pressure signal;
means for identifying a load imbalance in response to said strut pressure signal; and
means for identifying a potential frame damage condition if the load were to be dumped.

42. A load hauling machine, comprising:
a load carrying portion;
a ground engaging portion;
a frame connected to and between said load carrying portion and said ground engaging portion;
a plurality of pressure sensing devices connected to and between said load carrying portion and said ground engaging portion, each of said plurality of pressure sensing devices being adapted to produce pressure signals indicative of load characteristics; and
means for processing said pressure signals to quantify a job severity.

43. An apparatus, as set forth in claim 42, wherein the load hauling machine includes a plurality of suspension struts connected to and between said load carrying portion and said ground engaging portion, and said pressure signals indicate the pressure within said suspension struts.

44. An apparatus, as set forth in claim 42, wherein said means for processing said pressure signals to quantify job severity includes means for producing a histogram of estimated frame strain values.

45. An apparatus, as set forth in claim 42, wherein said means for processing said pressure signals to quantify job severity includes means for producing a histogram of pressure signals.

46. An apparatus, as set forth in claim 45, wherein the load hauling machine includes a plurality of suspension struts connected to and between said load carrying portion and said ground engaging portion, and said pressure signals indicate the pressure within said suspension struts.

47. A load hauling machine, comprising:
a load carrying portion;
a ground engaging portion;
a frame connected to and between said load carrying portion and said ground engaging portion;
a plurality of pressure sensing devices connected to and between said load carrying portion and said ground engaging portion, each of said plurality of pressure sensing devices being adapted to produce pressure signals indicative of load characteristics;
means for detecting a difference between two of said pressure signals being greater than a predetermined threshold;
means for producing an alert signal in response to detecting that said difference is greater than said predetermined threshold between pressure signals exists;
a motion sensor connected to said ground engaging portion for producing travel signals indicative of movement of the load hauling machine; and
means for determining whether the machine is being loaded, dumped, roaded while loaded, or roaded empty in response to said pressure signals and said travel signals, and wherein the value of said predetermined threshold is dependent upon whether said machine is being loaded, dumped, or roaded while loaded.

48. A load hauling machine, as set forth in claim 47, including:
means for detecting a pressure spike being greater than a second predetermined threshold; and
means for producing an alert signal in response to detecting that said difference between pressure signals exists.

* * * * *